US008208922B1

(12) United States Patent
Khanka et al.

(10) Patent No.: US 8,208,922 B1
(45) Date of Patent: Jun. 26, 2012

(54) SYSTEM AND METHOD FOR INTER-TECHNOLOGY CAPACITY HANDOVER OF A WIRELESS COMMUNICATION DEVICE

(75) Inventors: Bhagwan Khanka, Lenexa, KS (US); Anoop K. Goyal, Overland Park, KS (US); Shilpa Kowdley Srinivas, Herndon, VA (US); Hemanth Balaji Pawar, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 794 days.

(21) Appl. No.: 12/324,475

(22) Filed: Nov. 26, 2008

(51) Int. Cl.
*H04W 36/00* (2009.01)
*H04W 40/00* (2009.01)
*H04W 72/00* (2009.01)

(52) U.S. Cl. .............. 455/436; 455/453; 455/445

(58) Field of Classification Search .......... 455/436
See application file for complete search history.

(56) References Cited

U.S. PATENT DOCUMENTS

| 7,177,649 | B1 | 2/2007 | Nielsen | |
|---|---|---|---|---|
| 2004/0022265 | A1* | 2/2004 | Luz et al. | 370/466 |
| 2007/0173256 | A1* | 7/2007 | Laroia et al. | 455/436 |
| 2008/0076435 | A1* | 3/2008 | Chen et al. | 455/445 |

OTHER PUBLICATIONS

U.S. Appl. No. 11/212,067, entitled, "Use of Dual Asymmetric Wireless Links to Provide Bi-Directional High Data Rate Wireless Communication," filed Aug. 25, 2005.

Dr. Mustafa Ergen, Mobile Handset Design Line. "Access Service Network in WiMAX: The Role of ASN-GW-Part-III." Nov. 19, 2007.
Sunrise Telecom, "CDMA Network Monitoring Analysis Suite for CDMA2000 and CDMA 2000 EV-DO," Jul. 2008.
Sequans Communications, "SQN1140 and SQN1145 Setting the Standard," (Sep. 10, 2008).
Parviz Yegani, "WiMAX Overview," IETF-64, Nov. 7, 2005.
"Backhaul (telecommunicagions)," downloaded from the World Wide Web at http:/en.wikipedia.org/wiki/Backhaul_(telecommunicagions) on Oct. 22, 2008.
Nortel, "Nortel WiMAX Connectivity Service Network (CSN), Service Connectivity and IP Core Elements," Sep. 27, 2007.
Dr. Mustafa Ergen, "The Access Service Network in WiMAX: The Role of ASN-GW," Sep. 29, 2007.
Ling-Jyh Chen, et al., "A Smart Decision Model for Vertical Handoff," Apr. 24, 2004.

* cited by examiner

*Primary Examiner* — Dwayne Bost
*Assistant Examiner* — Timothy Pham

(57) ABSTRACT

A method and system for a wireless communication device (WCD) to perform handover from a first BTS that serves a plurality of WCDs via a first air interface protocol (AIP) and a second BTS that serves another plurality of WCDs via a second AIP. The first BTS includes a modem for data-transfer via the second AIP, and the second BTS includes a modem for data-transfer via the first AIP. While the WCD is engaging in a communication session via the first BTS and first AIP, the modem of the first BTS transmits a handover request via the second AIP. The second BTS receives the request and responsively reserves resources for the WCD to use after handover and notifies the first BTS of the resources via the second AIP. The first BTS notifies the WCD of the resources via the first AIP and the WCD hands over to the second BTS.

20 Claims, 11 Drawing Sheets

SYSTEM AND METHOD FOR INTER-TECHNOLOGY CAPACITY HANDOVER OF A WIRELESS COMMUNICATION DEVICE

BACKGROUND

Many people use wireless communication devices (WCDs), such as cell phones and personal digital assistants (PDAs), to communicate with cellular wireless networks. These WCDs and networks typically communicate with each other over a radio frequency (RF) air interface according to a wireless protocol such as Code Division Multiple Access (CDMA), perhaps in conformance with one or more industry specifications such as IS-2000. Wireless networks that operate according to the IS-2000 specification are often referred to as "1 xRTT networks," which stands for "Single Carrier Radio Transmission Technology networks." Another protocol that may be used is known as Evolution Data Optimized (Ev-DO), perhaps in conformance with one or more industry specifications such as IS-856, Release 0 and IS-856, Revision A. Other protocols may be used as well, such as: (i) Global System for Mobile Communications (GSM), (ii) Time Division Multiple Access (TDMA), (iii) Worldwide Interoperability for Microwave Access (WiMAX), perhaps in conformance with IEEE standard 802.16 for Wireless Metropolitan Area Networks (Wireless MAN), or (iv) Long-Term Evolution (LTE), established by the Third Generation Partnership Project (3GPP) industry group.

These networks typically provide services such as voice, Short Message Service (SMS) messaging, and packet-data communication, among others, and typically include a plurality of base transceiver stations (BTSs), each of which provide one or more coverage areas, such as cells and sectors (i.e., individual areas of a cell that allow the cell to carry more calls). When a WCD is positioned in one of these coverage areas, it can communicate over the air interface with the BTS, and in turn to a core network that provides the WCD with access to one or more circuit-switched and/or packet-switched signaling and/or transport networks.

WCDs and BTSs may conduct communication sessions (e.g. voice calls and data sessions) over a pair of frequencies known as carriers, with the BTS transmitting to the WCD on one of the frequencies, and the WCD transmitting to the BTS on the other. This is known as frequency division duplex (FDD). The BTS-to-WCD link is known as the forward link, while the WCD-to-BTS link is known as the reverse link.

Transmission of communications between the BTS and the core network may occur via a backhaul network. Under certain circumstances, such as when a cellular wireless network is servicing a large quantity of WCDs, the backhaul network, or at least a portion of the backhaul network, between the BTS and the core network may become congested. Under these circumstances, the quality of service being provided by the cellular wireless network may be reduced.

OVERVIEW

A wireless communication device (WCD) that is engaging in a communication session via a first base transceiver station (BTS) may handover from the first BTS to a second BTS. After the handover, the WCD may continue the communication session via the second BTS. The WCD may handover to the second BTS for any of a variety of reasons. For example, if the WCD is a mobile WCD, the WCD may handover from the first BTS to the second BTS as the WCD is moved from a cell or sector formed by the first BTS to a cell or sector formed by the second BTS. As another example, the WCD may handover if the quality of service being provided to the WCD by the first BTS is below a threshold level of service. (e.g., a first threshold amount of data bits per second). The quality of service may be reduced, for example, when a backhaul network being used by the first BTS is experiencing congestion (e.g., the backhaul network is transporting greater than a second threshold amount of data bits per second).

Performing handover of the WCD may include the first BTS and the second BTS transmitting information regarding the handover across one or more backhaul networks. Transmission of this information may increase the congestion of the backhaul network(s) and further reduce the quality of service being provided by the first BTS and/or the second BTS. The quality of service provided by a wireless network to the WCD and/or other WCDs may be improved, or at least not degraded any further, by reducing the amount of information sent across a backhaul network to perform handover of the WCD. The exemplary embodiments described herein may provide for such a reduction.

In one respect, an exemplary embodiment may take the form of a system comprising: (i) a first BTS operable to serve a first plurality of WCDs, and (ii) a second BTS operable to serve a second plurality of WCDs. Communications between the first BTS and the first plurality of WCDs are carried out in accordance with a first air interface protocol and communications between the second BTS and the second plurality of WCDs are carried out in accordance with a second air interface protocol. The first BTS comprises a modem to transfer data between the first BTS and the second BTS. This transfer of data is carried out in accordance with the second air interface protocol.

In another respect, an exemplary embodiment may take the form of a system comprising: (i) a first BTS operable to serve a first plurality of WCDs, and (ii) a second BTS operable to serve a second plurality of WCDs. Communications between the first BTS and the first plurality of WCDs are carried out in accordance with a first air interface protocol, and communications between the second BTS and the second plurality of WCDs are carried out in accordance with a second air interface protocol. The first BTS comprises a first modem to transfer first data between the first BTS and the second BTS. The transfer of the first data is carried out in accordance with the second air interface protocol. The second BTS comprises a second modem to transfer second data between the first BTS and the second BTS. The transfer of the second data is carried out in accordance with the first air interface protocol.

In yet another respect, an exemplary embodiment may take the form of a method carried out via a communications network comprising a first BTS and a second BTS. The first BTS serves a first plurality of WCDs via communications in accordance with a first air interface protocol. The first BTS comprises a modem to transfer data between the first BTS and the second BTS via communications in accordance with a second air interface protocol. The second BTS serves a second plurality of WCDs via communications in accordance with the second air interface protocol. The method comprises: (i) while a given WCD is engaging in a first portion of a communication session via the first BTS, the modem transmitting a request to hand over the given WCD, (ii) the second BTS receiving the request and thereafter the second BTS initiating reservation of resources, (iii) the second BTS transmitting a first notification that identifies the resources, and (iv) the first BTS receiving the first notification that identifies the resources and, thereafter, transmitting to the given WCD a second notification that identifies the resources so as to allow the given WCD to handover to the second BTS for engaging in the second portion of the communication session. The first portion of the communication session is carried out in accordance with the first air interface protocol, whereas the second portion of the communication session is carried out in accordance with the second air interface protocol. The resources comprise resources for the given WCD to engage in a second portion of the communication session via the second BTS. Transmission of the request is carried out in accordance with the second air interface protocol. Transmission of the second notification that identifies the resources is carried out in accordance with the first air interface protocol.

In still yet another respect, an exemplary embodiment may take the form of a method carried out via a first BTS including a first modem and a second BTS including a second modem. The first BTS serves a first plurality of WCDs via communications in accordance with a first air interface protocol. The first modem transfers data between the first BTS and the second BTS via communications in accordance with a second air interface protocol. The second BTS serves a second plurality of WCDs via communications in accordance with the second air interface protocol. The second modem transfers data between the first BTS and the second BTS via communications in accordance with the first air interface protocol. The method comprises: (i) while a given WCD is engaging in a first portion of a communication session via the first BTS, the first BTS transmitting a request to hand over the given WCD, (ii) the second modem receiving the request and thereafter the second BTS initiating reservation of resources, (iii) the second BTS transmitting a first notification that identifies the resources, and (iv) the first BTS receiving the first notification that identifies the resources and, thereafter, transmitting to the given WCD a second notification that identifies the resources so as to allow the given WCD to handover to the second BTS for engaging in the second portion of the communication session. The first portion of the communication session is carried out in accordance with the first air interface protocol, whereas the second portion of the communication session is carried out in accordance with the second air interface protocol. The resources comprise resources for the given WCD to engage in a second portion of the communication session via the second BTS. Transmission of the request is carried out in accordance with the first air interface protocol. Transmission of the first notification that identifies the resources is carried out in accordance with the second air interface protocol, whereas transmission of the second notification that identifies the resources is carried out in accordance with the first air interface protocol.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Exemplary embodiments of the invention are described herein with reference to the drawings, in which.

DETAILED DESCRIPTION

1. Exemplary Architecture

Figure 1:
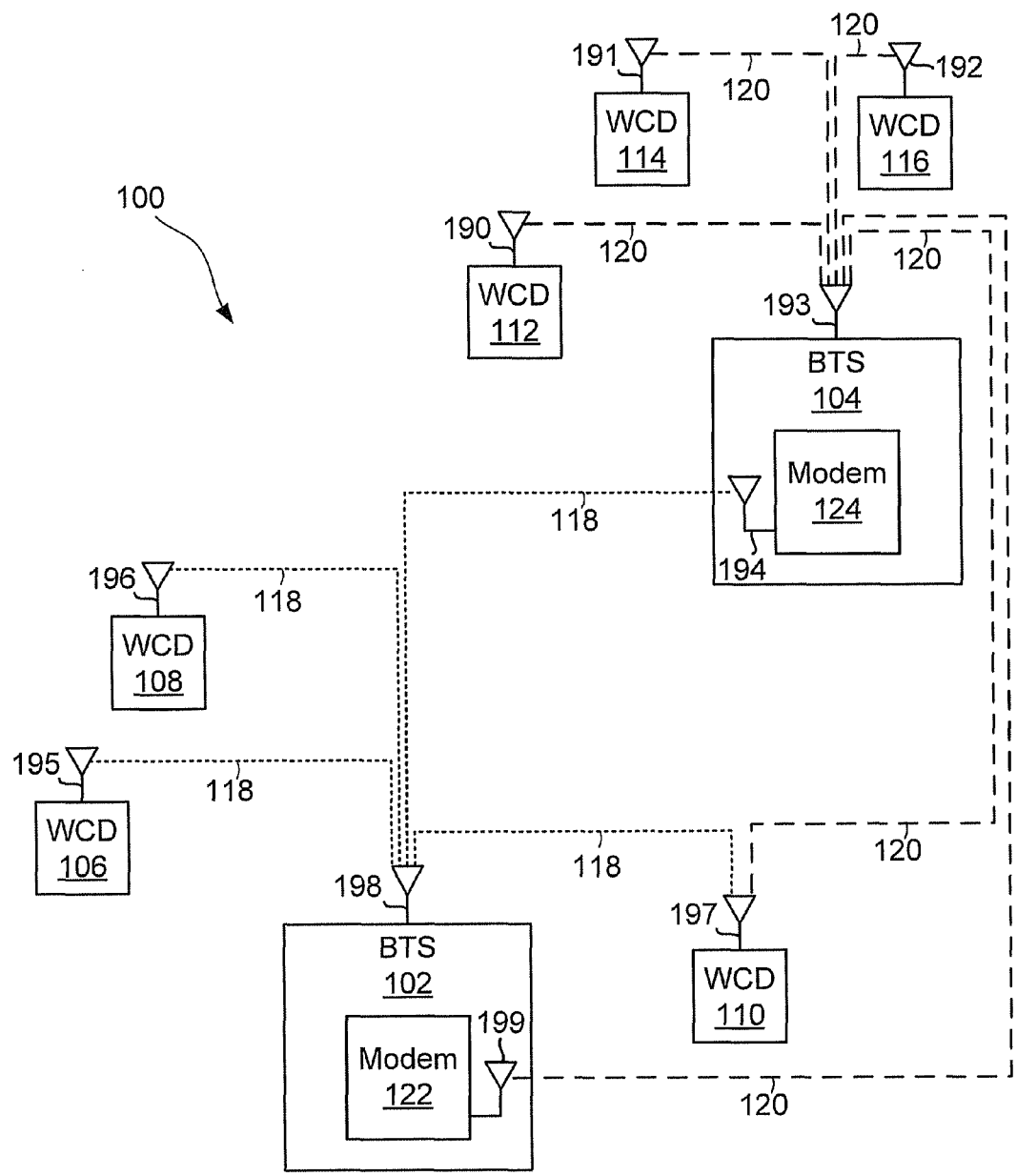
FIG. 1 is a block diagram of an exemplary communications network for carrying out exemplary embodiments.

FIG. 1 is a block diagram of an exemplary communications network 100 for carrying out exemplary embodiments described herein. It should be understood, however, that this and other arrangements described herein are provided for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location, and as any suitable combination of hardware, firmware, and/or software.

Communications network 100 may include base transceiver stations (BTSs) 102, 104 and wireless communication devices (WCDs) 106, 108, 110, 112, 114, 116. BTS 102 includes: (i) antennas 198, 199 and (ii) a modem 122 that connects to antenna 199. BTS 104 includes: (i) antennas 193, 194 and (ii) a modem 124 that connects to antenna 194. WCDs 106, 108, 110, 112, 114, 116 include and/or connect to antennas 195, 196, 197, 190, 191, 192, respectively. A person having ordinary skill in the art will understand that either antenna connected to modems 122, 124 may be integrated into a device comprising the antenna and the modem. A person having ordinary skill in the art will also understand that network 100 may include other WCDs and/or other BTSs as well.

BTS 102 is operable to serve a plurality of devices. As illustrated in FIG. 1, BTS 102 serves WCDs 106, 108, 110 and modem 124 via antenna 198. A person having ordinary skill in the art will understand that BTS 102 and antenna 198 may serve fewer or more devices than as shown in FIG. 1. The service provided by BTS 102, via antenna 198, allows for and/or includes the transmission of communications between BTS 102 and the devices served by BTS 102. The communications between BTS 102 and the devices served by BTS 102 via antenna 198 may be carried out in accordance with a first air interface protocol, and may be communications for carrying out a voice call, a data communication session, or some other communications. As an example, the first air interface protocol may be the WiMAX air interface protocol. For purposes of the FIG. 1, communications carried out in accordance with the first air interface protocol are depicted as dashed lines 118.

Similarly, BTS 104 is operable to serve a plurality of devices. As illustrated in FIG. 1, BTS 104 serves WCDs 110, 112, 114, 116 and modem 122 via antenna 193. A person having ordinary skill in the art will understand that BTS 104 and antenna 193 may serve fewer or more devices than as shown in FIG. 1. The service provided by BTS 104, via antenna 193, allows for and/or includes the transmission of communications between BTS 104 and the devices served by BTS 104. The communications between BTS 104 and the devices served by BTS 104 via antenna 193 may be carried out in accordance with a second air interface protocol, and may be communications for carrying out a voice call, a data communication session, or some other communications. As an example, the second air interface protocol may be the Ev-DO air interface protocol. For purposes of FIG. 1, communications carried out in accordance with the second air interface protocol are depicted as dashed lines 120.

Each of the antennas depicted in FIG. 1 may include one or more antennas. As an example, antenna 197 may include a first antenna operable for transmitting and receiving communications carried out in accordance with the first air interface protocol, and a second antenna for transmitting and receiving communications carried out in accordance with the second air interface protocol. As another example, antenna 193 of BTS 104 may include multiple antennas. In this regard, each of the multiple antennas may provide coverage for a respective sector of a cell formed by BTS 104.

Modem 122 and antenna 199 may be arranged to wirelessly transfer data between BTSs 102, 104. The transfer of data between BTSs 102, 104, via modem 122 and antenna 199, may include: (i) modem 122 transmitting data to BTS 104, and/or (ii) modem 122 receiving data transmitted via antenna 193 from BTS 104. The transfer of data between BTSs 102, 104 via modem 122 may be carried out in accordance with the second air interface protocol. As an example, modem 122 may comprise a chipset, such as a chipset used in Ev-DO-compatible WCDs. In this regard, the chipset may comprise an MSM6125™ chipset from Qualcomm, Inc. of San Diego, Calif., USA.

Modem 124 and antenna 194 may be arranged to wirelessly transfer data between BTSs 102, 104. The transfer of data between BTSs 102, 104, via modem 124 and antenna 194, may include: (i) modem 124 transmitting data to BTS 102 (e.g., to antenna 197), and/or (ii) modem 124 receiving data transmitted via antenna 198 from BTS 102. The transfer of data between BTSs 102, 104 via modem 124 may be carried out in accordance with the first air interface protocol. As an example, modem 124 may comprise a chipset, such as a chipset used in WiMAX-compatible WCDs. In this regard, the chipset may comprise an SQN1140 chipset from Sequans Communications of Cupertino, Calif., USA. In accordance with the embodiment shown in FIG. 1, WCDs 106, 108 may be Ev-DO-compatible WCDs, WCDS 112, 114, 116 may be WiMAX-compatible WCDs, and WCD 110 may be an Ev-DO/WiMAX-compatible WCD.

Each of WCDs 106, 108, 110, 112, 114, 116 may be any of a variety of devices for carrying out wireless communications. As an example, each of WCDs 106, 108, 110, 112, 114, 116 may comprise a device such as a cellular phone, a personal digital assistant (PDA), a wireless local loop hub, a laptop computer, a desktop personal computer, or some other type of device. Although FIG. 1 illustrates that WCD 110 receives communications in accordance with the first and second air interface protocols, the exemplary embodiments do not require WCD 110 to simultaneously receive these communications or prevent WCD 110 from simultaneously receiving these communications.

Additionally, a person having ordinary skill in the art will understand that one or more other WCDs, such as one or more of WCDS 106, 108 112, 114, 116, may be operable to receive communications in accordance with the first and second air interface protocols. Such WCDs may request handover from a BTS using the first air interface protocol for forward-link communications to a BTS using the second air interface protocol for forward-link communications, as well as handover from a BTS using the second air interface protocol for forward-link communications to a BTS using the first air interface protocol for forward-link communications. Such WCDs may simultaneously scan for communications in accordance with the first air interface protocol and communications in accordance with the second air interface protocol.

Figure 2:
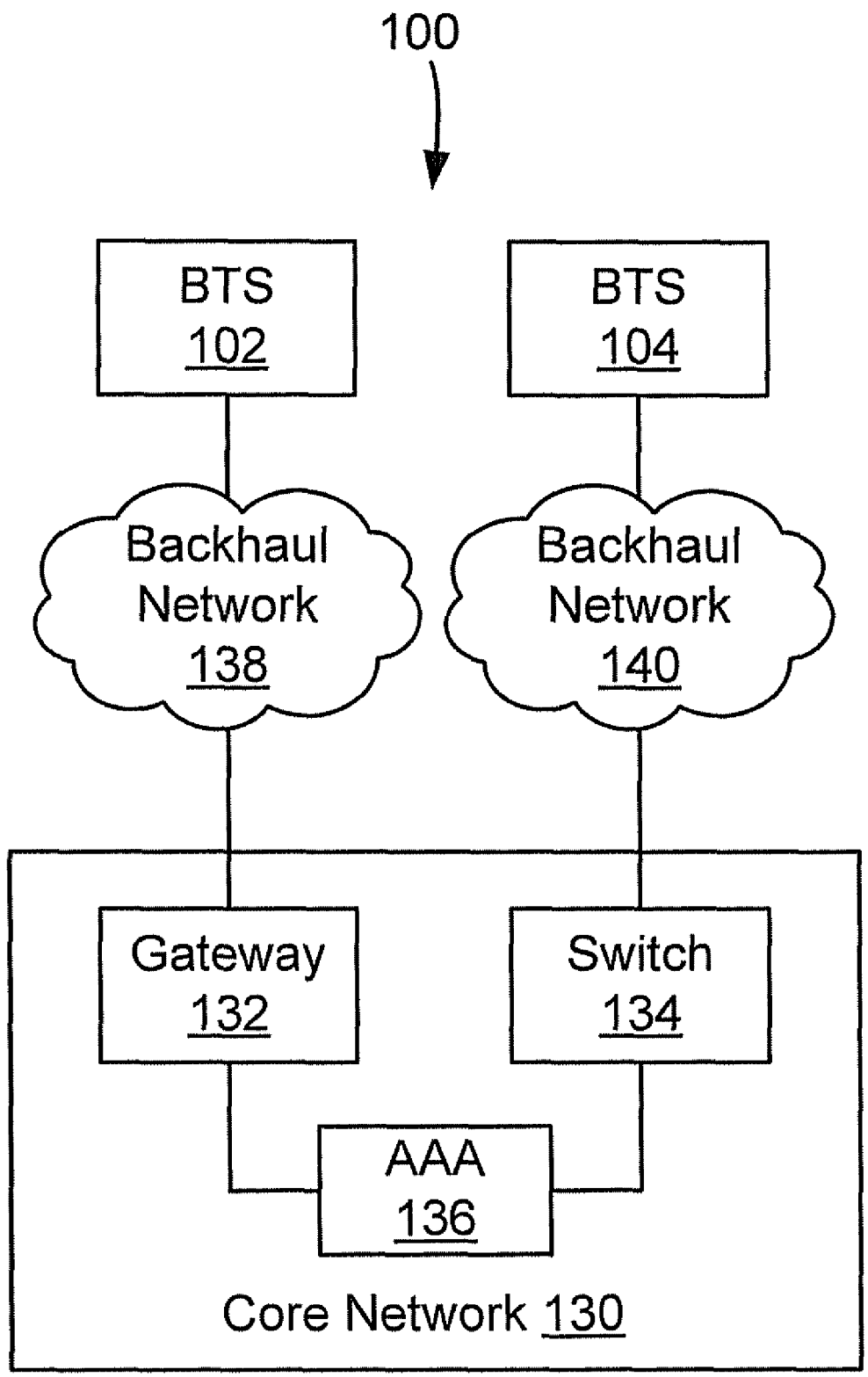
FIG. 2 is another block diagram of the exemplary communications network.

Next, FIG. 2 is a block diagram depicting additional details of communications network 100. As depicted in FIG. 2, communications network 100 includes: (i) BTS 102, (ii) BTS 104, (iii) a core network 130 including a gateway 132, a switch 134, and an authentication, authorization, and accounting (AAA) server 136, and (iv) backhaul networks 138, 140.

Core network 130 may be operated and/or maintained by a service provider that operates and/or maintains one or both of BTSs 102, 104 and that provides wireless service to WCDs 106, 108, 110, 112, 114, 116. The service provider may also operate and/or maintain one or more other BTSs (not shown), and the core network 130 may include other devices, such as additional gateways and switches, so as to provide service to a greater number of WCD users. Core network 130 may include other elements (not shown), such as a home agent (HA) server and a dynamic host control protocol (DHCP) server.

Gateway 132 is operable to carry out a variety of functions. As an example, gateway 132 may operate as an interface to backhaul network 138, switch 134, other gateways, and/or other devices. As another example, gateway 132 may forward data packets (e.g., IP data packets) to another device to which gateway 132 provides an interface. As yet another example, gateway 132 may participate in handover of a WCD and engage in communications with AAA server 136 to participate in the authorization, authentication, and accounting functions of AAA server 136 for the WCD. In accordance with the exemplary embodiment in which the first air interface protocol is the WiMAX protocol, gateway 132 may comprise an access service network gateway (ASN-GW), as known to those having ordinary skill in the art. Gateway 132 may also request a BTS, such as a BTS 102, to reserve resources for the WCD.

Gateway 132 comprises various resources that may be reserved for and thereafter used by a WCD. Such resources may include the resources that are needed for an air interface protocol to carry out a communication session. As an example, gateway 132 may comprise an ASN-gateway and the reserved resources may include a service flow ID, resources for a point-to-point protocol session, and/or some other resource. Other examples of the resources that may be reserved by gateway 132 and other examples of gateway 132 are also possible.

Switch 134 may provide access to one or more circuit-switched and/or packet-switched signaling and/or transport networks. As an example, the circuit-switched network may include a public switched telephone network (PSTN), whereas the packet-switched network may include the Internet. Switch 134 may be arranged in any of a variety of configurations. In accordance with the exemplary embodiment in which the second air interface protocol is the EV-DO protocol, switch 134 may comprise a radio network controller (RNC). An RNC may manage a plurality of BTSs, one of which is BTS 104. In an alternative embodiment in which the second air interface protocol is a CDMA-1xRTT protocol, switch 134 may comprise a base station controller (BSC) that manages BTS 104 and/or a mobile switching center (MSC). Switch 134 may also request a BTS, such as a BTS 104, to reserve resources for the WCD.

Switch 134 comprises various resources that may be reserved for and thereafter used by a WCD. Such resources may include the resources that are needed for an air interface protocol to carry out a communication session. As an example, switch 134 may comprise an Ev-DO switch and the reserved resources may include a unicast access terminal identifier (UATI), a UATI session, resources for a point-to-point protocol session, and/or some other switch resource. Other examples of the resources that may be reserved by switch 134 and other examples of switch 134 are also possible.

AAA server 136 may contain and/or have access to data (i.e., AAA data) for authenticating and authorizing WCDs to access BTS 102 and BTS 104. BTS 102 may refer to the AAA data so as to authenticate and authorize WCD 110 to use BTS 102. BTSs 102, 104 may share the AAA data. In this way, AAA server 136 may be able to perform accounting functions (e.g., tracking the number of minutes WCD 110 carries out a communication session via BTS 102 or BTS 104) regardless of whether a WCD uses BTS 102 or BTS 104. Furthermore, gateway 132 and switch 134 may be arranged such that when a WCD is to handover from BTS 102 to BTS 104, or from BTS 104 to BTS 102, gateway 132 and switch 134 do not have to authenticate and/or authenticate the WCD to be handed over.

Backhaul network 138 may carry communications between BTS 102 and core network 130, and more particularly, between BTS 102 and gateway 132. As an example, backhaul network 138 may carry reverse-link communication transmitted from WCDs 106, 108, 110, and forward-link communications that are destined for one or more of WCDs 106, 108, 110. Backhaul network 138 may be arranged in any of a variety of configurations. For example, backhaul network 138 may be arranged as a network comprising one or more lines or links selected from T1 lines (e.g., a line comprising 24 digital signal (DS) channels, each channel operable at 1.544 Mb/seconds), microwave communication links, Ethernet lines, digital subscriber lines (DSL) (e.g., asynchronous DSL or symmetric high-bit-rate DSL), fiber optic communication links, or some other links or lines. At least a portion of backhaul network 138 may be part of and/or interface to the Internet.

Backhaul network 140 may carry communications between BTS 104 and core network 130, and more particularly, between BTS 104 and switch 134. As an example, backhaul network 140 may carry reverse-link communication transmitted from WCDs 110, 112, 114, 116 and forward-link communications that are destined for one or more of WCDs 110, 112, 114, 116. Backhaul network 140 may be arranged in any of a variety of configurations. The exemplary configurations of backhaul network 138 are also exemplary configurations of backhaul network 140. Although backhaul networks 138, 140 are depicted in FIG. 2 as separate networks, in an alternative arrangement, backhaul networks 138, 140, or at least a portion of each of these networks, may be a part of a common backhaul network for carrying communications between BTSs 102, 104 and core network 130.

Figure 3:
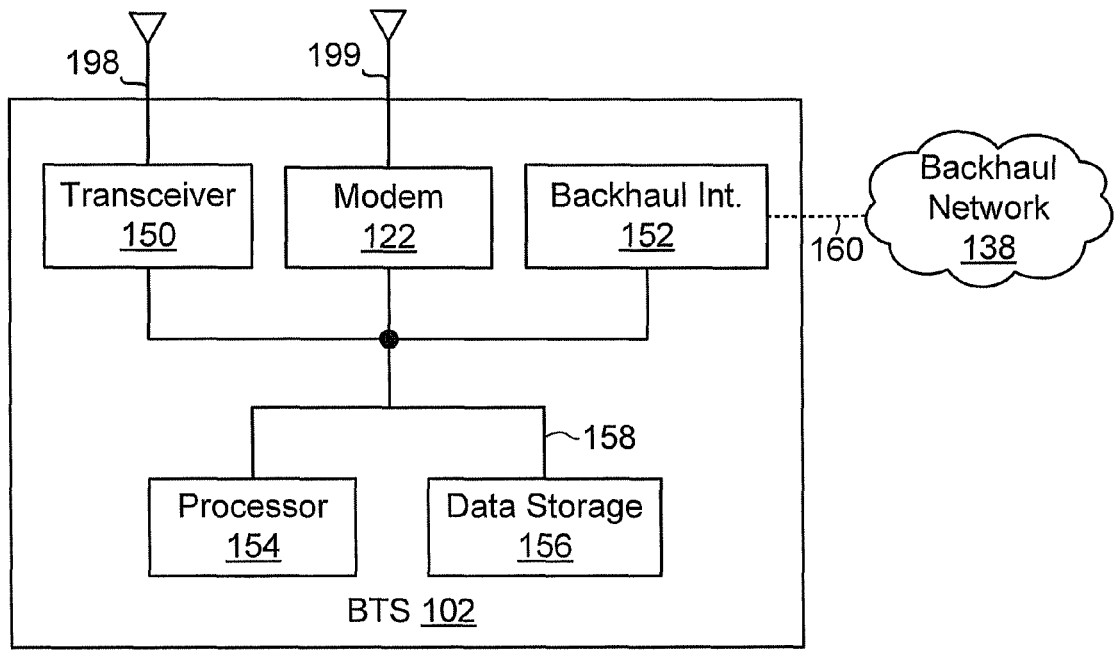
FIG. 3 is a block diagram of an exemplary base transceiver station.

Next, FIG. 3 is a block diagram depicting additional details of BTS 102. As depicted in FIG. 3, BTS 102 includes modem 122, a transceiver 150, a backhaul interface 152, a processor 154, and a data storage device 156, all of which may be linked together via a system bus, network, or other connection mechanism 158.

Transceiver 150 may include a transmitter to transmit RF communications in accordance with the first air interface protocol, and a receiver to receive RF communications in accordance with the first air interface protocol. As indicated above, for purposes of example in this description, the first air interface protocol is the WiMAX protocol. In this regard, the RF communications transmitted by transceiver 150 may form a WiMAX cell. BTS 104, and in particular modem 124, is located within and/or adjacent to the cell formed by transceiver 150. Additionally, the WCDs being served by BTS 102 are located within the cell formed by transceiver 150.

Backhaul interface 152 provides an interface to backhaul network 138. As an example, backhaul interface 152 may comprise a network interface card (NIC), such as a NIC that transmits and receives Internet Protocol (IP) traffic, asynchronous transfer mode (ATM) traffic, or some other type of traffic carried over network 138. Backhaul network 138 may include a communication link 160 that connects to backhaul interface 152. As an example, the communication link 160 may comprise one or more fiber optic cables, coaxial cables (e.g., an RG6 cable), T1 lines, or some other type of cables or lines. Alternatively, communication link 160 may comprise an air interface, such as an air interface that carries out communications in accordance with a given air interface protocol. A person having ordinary skill in the art will understand that the air interface of communication link 160 may comprise one or more channels for carrying communications to and/or from backhaul interface 152.

Processor 154 may comprise one or more general purpose processors (e.g., INTEL microprocessors) and/or one or more special purpose processors (e.g., digital signal processors). Processor 154 may execute computer-readable program instructions that are stored in data storage device 156.

Data storage device 156 comprises a computer-readable storage medium readable by processor 154. The computer-readable storage medium may comprise volatile and/or non-volatile storage components, such as optical, magnetic, organic or other memory or disc storage, which can be integrated in whole or in part with processor 154.

Data storage device 156 may contain a variety of computer-readable program instructions. As an example, the program instructions may include instructions that cause processor 154 to determine that backhaul interface 152, communication link 160, and/or backhaul network 138 has/have become congested and that one or more WCDs being served by BTS 102 should be handed over to another BTS. As an example, a BTS may detect such congestion by determining that traffic being buffered at a traffic buffer of the BTS has exceeded a threshold level of buffered traffic, detecting that packets being sent to and/or from the BTS are being dropped, and/or by determining that a latency time for a packet being sent from the BTS or to the BTS has exceeded a threshold latency level. Other examples of program instructions contained at data storage device 156 are described below.

Data storage device 156 may also contain various threshold data values, such as a threshold data value that represents the first threshold amount of data bits per second, recited above, and/or a threshold data value that represents the second threshold amount of data bits per second, recited above.

Figure 4:
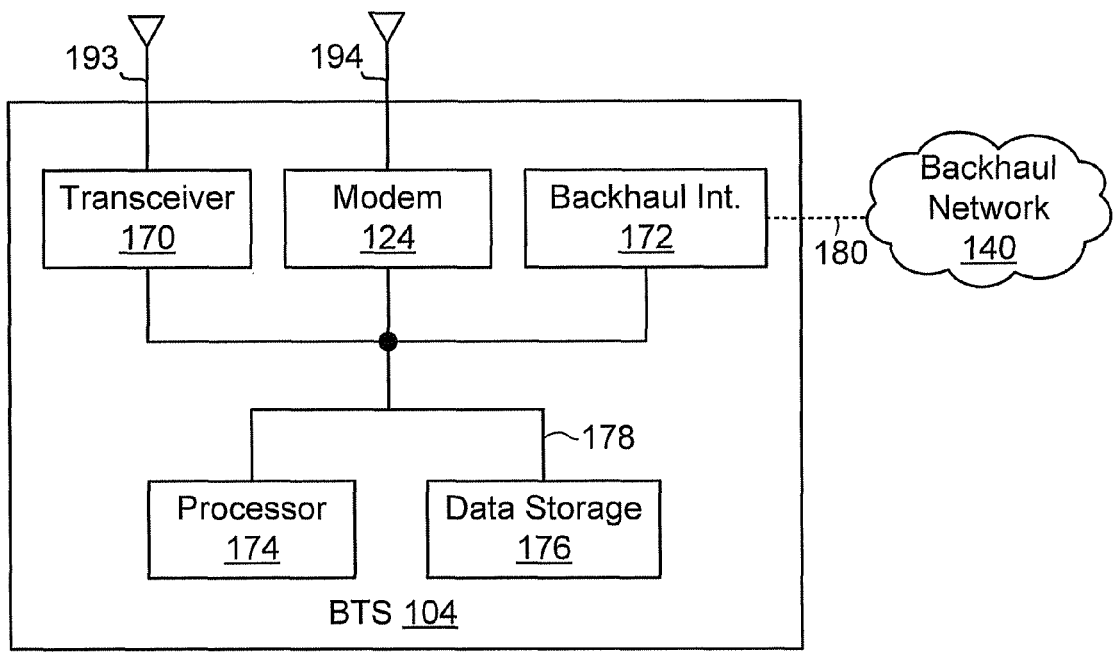
FIG. 4 is a block diagram of another exemplary base transceiver station.

Next, FIG. 4 is a block diagram depicting additional details of BTS 104. As depicted in FIG. 4, BTS 104 includes modem 124, a transceiver 170, a backhaul interface 172, a processor 174, and a data storage device 176, all of which may be linked together via a system bus, network, or other connection mechanism 178.

Transceiver 170 may include a transmitter to transmit RF communications in accordance with the second air interface protocol, and a receiver to receive RF communications in accordance with the second air interface protocol. As indicated above, for purposes of example in this description, the second air interface protocol is the Ev-DO protocol. In this regard, the RF communications transmitted by transceiver 170 may form an EV-DO cell. BTS 102, and in particular modem 122, is located within and/or adjacent to the cell formed by transceiver 170. Additionally, the WCDs being served by BTS 104 are located within the cell formed by transceiver 170. A person having ordinary skill in the art will understand that the cell formed by transceiver 170 may overlap with a cell formed by another BTS, such as BTS 102.

Backhaul interface 172 provides an interface to backhaul network 140. As an example, backhaul interface 172 may comprise a NIC, such as a NIC that transmits and receives IP traffic, ATM traffic, or some other type of traffic carried over network 140. Backhaul network 140 may include a communication link 180 that connects to backhaul interface 172. As an example, the communication link 180 may comprise one or more fiber optic cables, coaxial cables, T1 lines, or some other type of cables or lines. Alternatively, communication link 180 may comprise an air interface, such as an air interface that carries out communications in accordance with a given air interface protocol. A person having ordinary skill in the art will understand that the air interface of communication link 180 may comprise one or more channels for carrying communications to and/or from backhaul interface 172.

Processor 174 may comprise one or more general purpose processors (e.g., INTEL microprocessors) and/or one or more special purpose processors (e.g., digital signal processors). Processor 174 may execute computer-readable program instructions that are stored in data storage device 176.

Data storage device 176 comprises a computer-readable storage medium readable by processor 174. The computer-readable storage medium may comprise volatile and/or non-volatile storage components, such as optical, magnetic, organic or other memory or disc storage, which can be integrated in whole or in part with processor 174.

Data storage 176 may contain a variety of computer-readable program instructions. As an example, the program instructions may include instructions that cause processor 174 to determine that backhaul interface 172, communication link 180, and/or backhaul network 140 has/have become congested and that one or more WCDs being served by BTS 104 should be handed over to another BTS. Other examples of program instructions contained at data storage device 176 are described below.

Data storage device 176 may also contain various threshold data values, such as a threshold data value that represents the first threshold amount of data bits per second, recited above, and/or a threshold data value that represents the second threshold amount of data bits per second, recited above.

2. Exemplary Operation

A. Handover of WCD from First BTS to Second BTS

Figure 5:
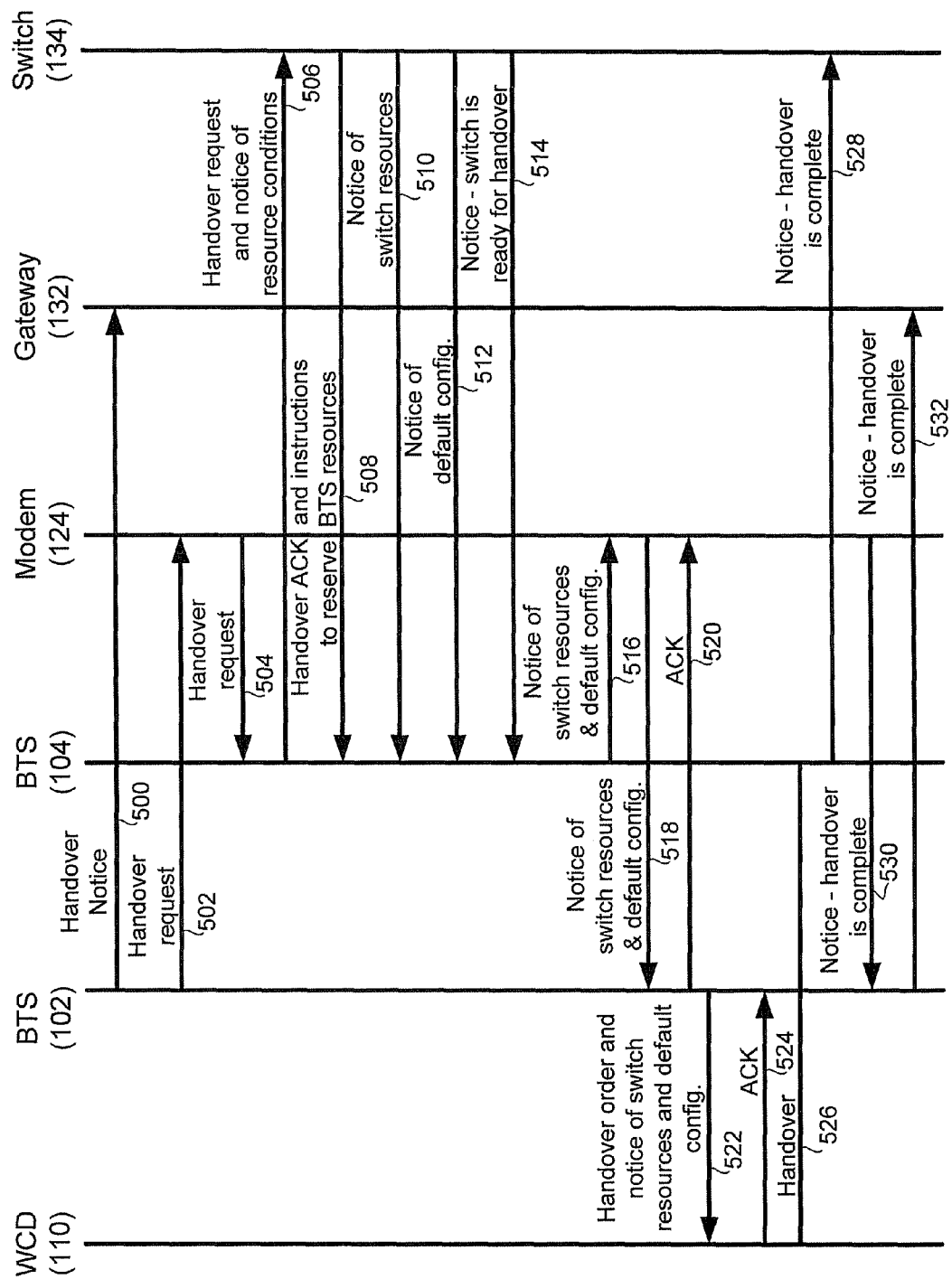
FIG. 5 is a flow diagram depicting an exemplary set of functions that may be carried out in accordance with an exemplary embodiment.

FIG. 5 is a flow diagram depicting an exemplary set of functions that may be carried out in accordance with an exemplary embodiment. The devices that carry out a portion of at least one of these functions are listed at the top of FIG. 5. Each of the functions is represented by a line and some text. For some of the functions, the line has an arrow at one end to point to the device that receives a message from another device. A person having ordinary skill in the art will understand that one or more of the messages described below with respect to FIG. 5 may comprise one or more messages, and that two or more of the functions may be combined. Additionally, the person having ordinary skill in the art will understand that transmission of one or more of the messages described below with respect to FIG. 5 may be transmitted as a plurality of data packets comprising a respective portion of the message, and a device that receives the plurality of packets may recover the contents of each received packet and then reconstruct the message.

At line 500, BTS 102 transmits to gateway 132 a message to provide notice (e.g., a notification message) that WCD 110 is going to hand over to another BTS. The notification message of line 500 may identify the BTS (e.g., BTS 104) to which WCD 110 is going to hand over. BTS 102 may send the notification message of line 500 in response to BTS 102 making a determination that WCD 110 should be handed over. In another respect, instead of BTS 102 transmitting the notification message of line 500, gateway 132 may make a determination that WCD 110 should be handed over to BTS 104 and responsively transmit to BTS 102 a notification message that WCD 110 should be handed over. In yet another respect, WCD 110 may determine that it should handover to BTS 104 and notify BTS 102 that it is going to handover.

Next, at line 502, BTS 102 transmits to modem 124 a handover request message. Transmission of the handover request message of line 502 may be carried out in accordance with the first air interface protocol (e.g., the WiMAX protocol). Data storage 156 may contain program instructions that are executable to cause transceiver 150 to transmit the handover request message of line 502. Processor 154 may execute these program instructions in response to determining that WCD 110 should be handed over to another BTS. In this regard, for example, processor 154 may make this determination in response to receiving a handover request from WCD 110 or, in the alternative arrangement, the notification message of line 500 sent by gateway 132. Transmission of the handover request message of line 502 may occur prior to, simultaneous to, or after transmission of the notification message of line 500. For purposes of this description, this handover request message sent at line 502 is referred to as "request-502."

Next, at line 504, modem 124 transmits to and/or within BTS 104 a handover request message. In this regard, modem 124 may transmit (e.g., forward) to processor 174 the handover request message received from BTS 102 at line 502. The transmission of the handover request message of line 504 may occur via connection mechanism 178.

Next, at line 506, BTS 104 transmits to switch 134 a message to provide a handover request and notice of resource conditions. As an example, the resource conditions may include (i) a media access channel identifier (MAC ID) availability (e.g., the percentage or quantity of BTS MAC ID in use), (ii) BTS channel element availability (e.g., the percentage or quantity of BTS channel elements in use), (iii) service flow availability (e.g., the percentage or quantity of service flows in use), and/or (iv) RF slot utilization (e.g., the percentage or quantity of RF slots in use). The transmission of the message of line 506 may be carried out via backhaul interface 172 and backhaul network 140. Data storage 176 may contain program instructions that are executable to cause backhaul interface 172 to transmit the message of line 506 to backhaul network 140. Processor 174 may execute these program instructions in response to BTS 104 receiving the message of line 504.

Next, at line 508, switch 134 transmits to BTS 104 a message to acknowledge receipt of the handover request and to provide instructions for BTS 104 to reserve resources for WCD 110. For purposes of this description, the resources to be reserved by BTS 104 are referred to as "resources-A." As an example, resources-A may include a MAC ID, a BTS channel element, a service flow identifier, an RF slot, and/or some other BTS resource. Transmission of the message of line 508 may be carried out via backhaul network 140. A data storage device (not shown) at switch 134 may contain program instructions that are executable to cause switch 134 to transmit the message of line 508 to backhaul network 140. A processor (not shown) at switch 134 may execute these program instructions in response to switch 134 receiving the message of line 506.

Next, at line 510, switch 134 transmits to BTS 104 a message to provide notice of the switch resources reserved by switch 134. Transmission of the message of line 510 may be carried out via backhaul network 140. The data storage device at switch 134 may contain program instructions that are executable to cause switch 134 to transmit the message of line 510. The processor at switch 134 may execute these program instructions in response to switch 134 receiving the message of line 506 and/or upon reserving the switch resources. The switch resources reserved by switch 134 may comprise resources that are reserved for use by WCD 110 after handover of WCD 110. As an example, the switch resource of switch 134 may comprise a UATI and resources for a point-to-point protocol session. Other examples of the switch resources are also possible.

Next, at line 512, switch 134 transmits to BTS 104 a message to provide notice of a default configuration. In general, the default configuration may be identified by a variety of data, such as data that indicates how BTS 104 is operating and/or data that indicates how WCD 110 should operate. In particular, the default configuration may be identified by data that indicates attributes WCD 110 should use to perform handover, a type of encryption used by BTS 104 and/or to be used by WCD 110, and/or some other type of data. Transmission of the message of line 512 may be carried out via backhaul network 140. The data storage device at switch 134 may contain program instructions that are executable to cause switch 134 to transmit the message of line 512 to backhaul network 140. The processor at switch 134 may execute these program instructions in response to switch 134 receiving the message of line 506 and/or upon determining the default configuration.

Next, at line 514, switch 134 transmits to BTS 104 a message to provide notice that switch 134 is ready for handover of WCD 110. Transmission of the notification message of line 514 may be carried out via backhaul network 140. The data storage device at switch 134 may contain program instructions that are executable to cause switch 134 to transmit the message of line 514 to backhaul network 140. The processor at switch 134 may execute these program instructions in response to switch 134 sending the messages of lines 508, 510, 512 and/or determining that it is ready for handover of WCD 110.

Next, at line 516, BTS 104 transmits to modem 124 a message to provide notice of the switch resources and the default configuration. Transmission of the notification message of line 516 may occur from processor 174 to modem 124 via connection mechanism 178. Data storage 176 may contain program instructions that cause processor 174 to transmit the notification message of line 516. Processor 174 may execute these program instructions in response to processor 174 receiving the notification message of line 514.

Next, at line 518, modem 124 transmits to BTS 102 a message to provide notice of the switch resources of switch 134 and the default configuration of WCD 110. The transmission of the notification message of line 518 is carried out in accordance with the first air interface protocol. Transceiver 150 may receive the notification message of line 518 and responsively provide the received notification message to processor 154.

Next, at line 520, BTS 102 transmits to modem 124 a message to acknowledge (e.g., an acknowledgement message) that BTS 102 has received the notification message of line 518. The transmission of the acknowledgment message of line 520 is carried out in accordance with the first air interface protocol. The acknowledgment message of line 520 may comprise a plurality of acknowledgment messages, such as a message to acknowledge receipt of the notice of the switch resources and another message to acknowledge receipt of the notice of the default configuration.

Next, at line 522, BTS 102 transmits to WCD 110 a message comprising a handover order and notice of the switch resources and the default configuration. Transmission of the message of line 522 is carried out in accordance with the first air interface protocol. Data storage 156 may contain program instructions that are executable to cause transceiver 150 to transmit the message of line 522. Processor 154 may execute these program instructions in response to BTS 102 receiving the notification message of line 518.

Next, at line 524, WCD 110 transmits to BTS 102 a message to acknowledge that WCD 110 has received the message of line 522. The transmission of the acknowledgment message of line 524 is carried out in accordance with the first air interface protocol. The acknowledgment message of line 524 may comprise a plurality of acknowledgment messages, such as a message to acknowledge receipt of the handover order, and another message to acknowledge receipt of the notice of the switch resources and the default configuration.

Next, at line 526, WCD 110 hands over to BTS 104. Line 526 is shown without any arrows. In this regard, WCD 110 may not transmit a message to indicate that it has handed over to BTS 104. In this way, if BTS 104 comprises an Ev-DO BTS, then BTS 104 may determine that WCD 110 has handed over by receiving a data rate control (DRC) request from WCD 110. Alternatively, WCD 110 may transmit to BTS 104 a notification message that it has handed over to BTS 104.

Next, at line 528, BTS 104 transmits to switch 134 a message to provide notice that the handover of WCD 110 is complete. Transmission of the notification message of line 528 may be carried out via backhaul network 140. Data storage 176 may contain program instructions that are executable to cause backhaul interface 172 to transmit the notification message of line 528. Processor 174 may execute these program instructions upon determining that WCD 110 has handed over to BTS 104.

Next, at line 530, modem 124 transmits to BTS 102 a message to provide notice that the handover of WCD 110 is complete. Transmission of the notification message of line 530 may be carried out in accordance with the first air interface protocol. Data storage 176 may contain program instructions that are executable to cause modem 124 to transmit the notification message of line 530. Processor 174 may execute these program instructions in response to WCD 110 handing over to BTS 104 at line 526. Transceiver 150 may receive the notification message of line 530 and responsively provide the received notification message to processor 154.

Next, at line 532, BTS 102 transmits to gateway 132 a message to provide notice that the handover of WCD 110 is complete. Transmission of the notification message of line 532 may be carried out via backhaul network 138. Data storage 156 may contain program instructions that are executable to cause backhaul interface 152 to transmit the notification message of line 532. Processor 154 may execute these program instructions in response to it receiving the notification message of line 530.

Figure 6:
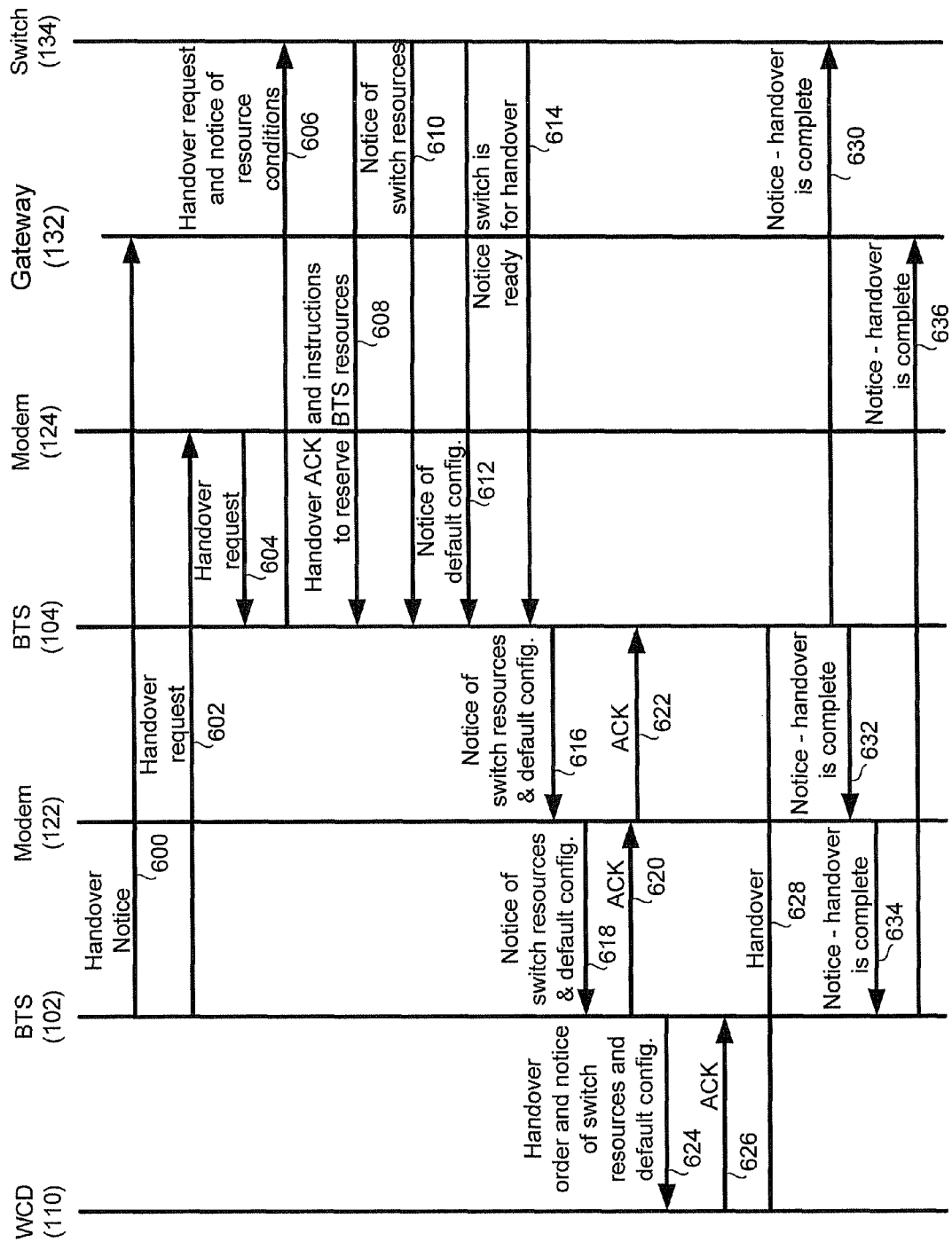
FIG. 6 is a flow diagram depicting another exemplary set of functions that may be carried out in accordance with an exemplary embodiment.

Next, FIG. 6 is a flow diagram depicting another exemplary set of functions that may be carried out in accordance with an exemplary embodiment. The devices that carry out a portion of at least one of these functions are listed at the top of FIG. 6. Each of these functions is represented by a line and some text. For some of the functions, the line has an arrow at one end to point to the device that receives a message from another device. A person having ordinary skill in the art will understand that one or more of the messages described below with respect to FIG. 6 may comprise one or more messages, and that two or more of the functions may be combined. Additionally, the person having ordinary skill in the art will understand that transmission of one or more of the messages described below with respect to FIG. 6 may be transmitted as a plurality of data packets comprising a respective portion of the message, and a device that receives the plurality of packets may recover the contents of each received packet and then reconstruct the message.

At line 600, BTS 102 transmits to gateway 132 a message to provide notice that WCD 110 is going to hand over to another BTS. The notification message of line 600 may identify the BTS (e.g., BTS 104) to which WCD 110 is going to hand over. BTS 102 may send the notification message of line 600 in response to BTS 102 making a determination that WCD 110 should be handed over. In another respect, instead of BTS 102 transmitting the notification message of line 600, gateway 132 may make a determination that WCD 110 should be handed over to BTS 104 and responsively transmit to BTS 102 a notification message that WCD 110 should be handed over. In yet another respect, WCD 110 may determine that it should handover to BTS 104 and notify BTS 102 that it is going to handover.

Next, at line 602, BTS 102 transmits to modem 124 a handover request message. Transmission of the handover request message of line 602 may be carried out in accordance with the first air interface protocol (e.g., the WiMAX protocol). Data storage 156 may contain program instructions that are executable to cause transceiver 150 to transmit the handover request message of line 602. Processor 154 may execute these program instructions in response to determining that WCD 110 should be handed over to another BTS. In this regard, for example, processor 154 may make this determination in response to receiving a handover request from WCD 110 or, in the alternative arrangement, the notification message of line 600 sent by gateway 132. Transmission of the handover request message of line 602 may occur prior to, simultaneous to, or after transmission of the notification message of line 600. For purposes of this description, this handover request message sent at line 602 is referred to as "request-602."

Next, at line 604, modem 124 transmits to and/or within BTS 104 a handover request message. In this regard, modem 124 may transmit to processor 174 the handover request message received from BTS 102 at line 602. The transmission of the handover request message of line 604 may occur via the connection mechanism 178.

Next, at line 606, BTS 104 transmits to switch 134 a message to provide a handover request and notice of resource conditions. As an example, the resource conditions may include (i) MAC ID availability, (ii) BTS channel element availability, (iii) service flow availability, and/or (iv) RF slot utilization. The transmission of the message of line 606 may be carried out via backhaul interface 172 and backhaul network 140. Data storage 176 may contain program instructions that are executable to cause backhaul interface 172 to transmit the message of line 606 to backhaul network 140. Processor 174 may execute these program instructions in response to BTS 104 receiving the message of line 604.

Next, at line 608, switch 134 transmits to BTS 104 a message to acknowledge receipt of the handover request and to provide instructions for BTS 104 to reserve resources (e.g., resources-A, as described above) for WCD 110. Transmission of the message of line 608 may be carried out via backhaul network 140. A data storage device (not shown) at switch 134 may contain program instructions that are executable to cause switch 134 to transmit the message of line 608 to backhaul network 140. A processor (not shown) at switch 134 may execute these program instructions in response to switch 134 receiving the message of line 606.

Next, at line 610, switch 134 transmits to BTS 104 a message to provide notice of the switch resources reserved by switch 134. Transmission of the message of line 610 may be carried out via backhaul network 140. The data storage device at switch 134 may contain program instructions that are executable to cause switch 134 to transmit the message of line 610. The processor at switch 134 may execute these program instructions in response to switch 134 receiving the message of line 606 and/or upon reserving the switch resources. The switch resources reserved by switch 134 may comprise resources that are reserved for use by WCD 110 after handover of WCD 110.

Next, at line 612, switch 134 transmits to BTS 104 a message to provide notice of a default configuration. Transmission of the message of line 612 may be carried out via backhaul network 140. The data storage device at switch 134 may contain program instructions that are executable to cause switch 134 to transmit the message of line 612 to backhaul network 140. The processor at switch 134 may execute these program instructions in response to switch 134 receiving the message of line 606 and/or upon determining the default configuration, such as the default configuration described above for line 512.

Next, at line 614, switch 134 transmits to BTS 104 a message to provide notice that switch 134 is ready for handover of WCD 110. Transmission of the notification message of line 614 may be carried out via backhaul network 140. The data storage device at switch 134 may contain program instructions that are executable to cause switch 134 to transmit the message of line 614 to backhaul network 140. The processor at switch 134 may execute these program instructions in response to switch 134 sending the messages of lines 608, 610, 612 and/or determining that it is ready for handover of WCD 110.

Next, at line 616, BTS 104 transmits to modem 122 a message to provide notice of the switch resources and the default configuration. The transmission of the notification message of line 616 is carried out in accordance with the second air interface protocol. Data storage 176 may contain program instructions that are executable to cause transceiver 170 to transmit the notification message of line 616. Processor 174 may execute these program instructions in response to BTS 104 receiving the notification message of line 614.

Next, at line 618, modem 122 transmits to BTS 102 a message to provide notice of the switch resources of switch 134 and the default configuration of WCD 110. The transmission of the notification message of line 618 is carried out in accordance with the second air interface protocol. Transceiver 170 may receive the notification message of line 618 and responsively provide the received notification message to processor 174.

Next, at line 620, BTS 102 transmits to modem 122 a message to acknowledge that BTS 102 has received the notification message of line 618. The transmission of the acknowledgement message of line 620 may occur via connection mechanism 158.

Next, at line 622, modem 122 transmits to BTS 104 a message to acknowledge that BTS 102 has received the notification message of line 618. The transmission of the acknowledgment message of line 622 is carried out in accordance with the second air interface protocol. The acknowledgment message of line 622 may comprise a plurality of acknowledgment messages, such as a message to acknowledge receipt of the handover order, and another message to acknowledge receipt of the notice of the switch resources and the default configuration.

Next, at line 624, BTS 102 transmits to WCD 110 a message comprising a handover order and notice of the switch resources and the default configuration. Transmission of the message of line 624 is carried out in accordance with the first air interface protocol. Data storage 156 may contain program instructions that are executable to cause transceiver 150 to transmit the message of line 624. Processor 154 may execute these program instructions in response to BTS 102 receiving the notification message of line 618.

Next, at line 626, WCD 110 transmits to BTS 102 a message to acknowledge that WCD 110 has received the acknowledgement message of line 624. The transmission of the acknowledgment message of line 626 is carried out in accordance with the first air interface protocol. The acknowledgment message of line 626 may comprise a plurality of acknowledgment messages, such as a message to acknowledge receipt of the handover order, and another message to acknowledge receipt of the notice of the switch resources and the default configuration.

Next, at line 628, WCD 110 hands over to BTS 104. Line 628 is shown without any arrows. In this regard, WCD 110 may not transmit a message to indicate that it has handed over to BTS 104. In this way, if BTS 104 comprises an Ev-DO BTS, then BTS 104 may determine that WCD 110 has handed over by receiving a DRC request from WCD 110. Alternatively, WCD 110 may transmit to BTS 104 a notification message that it has handed over to BTS 104.

Next, at line 630, BTS 104 transmits to switch 134 a message to provide notice that the handover of WCD 110 is complete. Transmission of the notification message of line 630 may be carried out via backhaul network 140. Data storage 176 may contain program instructions that are executable to cause backhaul interface 172 to transmit the notification message of line 630. Processor 174 may execute these program instructions upon determining that WCD 110 has handed over to BTS 104.

Next, at line 632, BTS 104 transmits to modem 122 a message to provide notice that the handover of WCD 110 is complete. Transmission of the notification message of line 632 may be carried out in accordance with the second air interface protocol. Data storage 176 may contain program instructions that are executable to cause transceiver 170 to transmit the notification message of line 632. Processor 174 may execute these program instructions in response to BTS 104 receiving the notification message of line 632.

Next, at line 634, modem 122 transmits to BTS 102 a message to provide notice that the handover of WCD 110 is complete. In this regard, modem 122 may transmit to processor 154 the notification message received from BTS 104 at line 632. The transmission of the notification message of line 634 may occur via connection mechanism 158.

Next, at line 636, BTS 102 transmits to gateway 132 a message to provide notice that the handover of WCD 110 is complete. Transmission of the notification message of line 636 may be carried out via backhaul network 138. Data storage 156 may contain program instructions that are executable to cause backhaul interface 152 to transmit the notification message of line 636. Processor 154 may execute these program instructions in response to it receiving the notification message of line 634.

Figure 7:
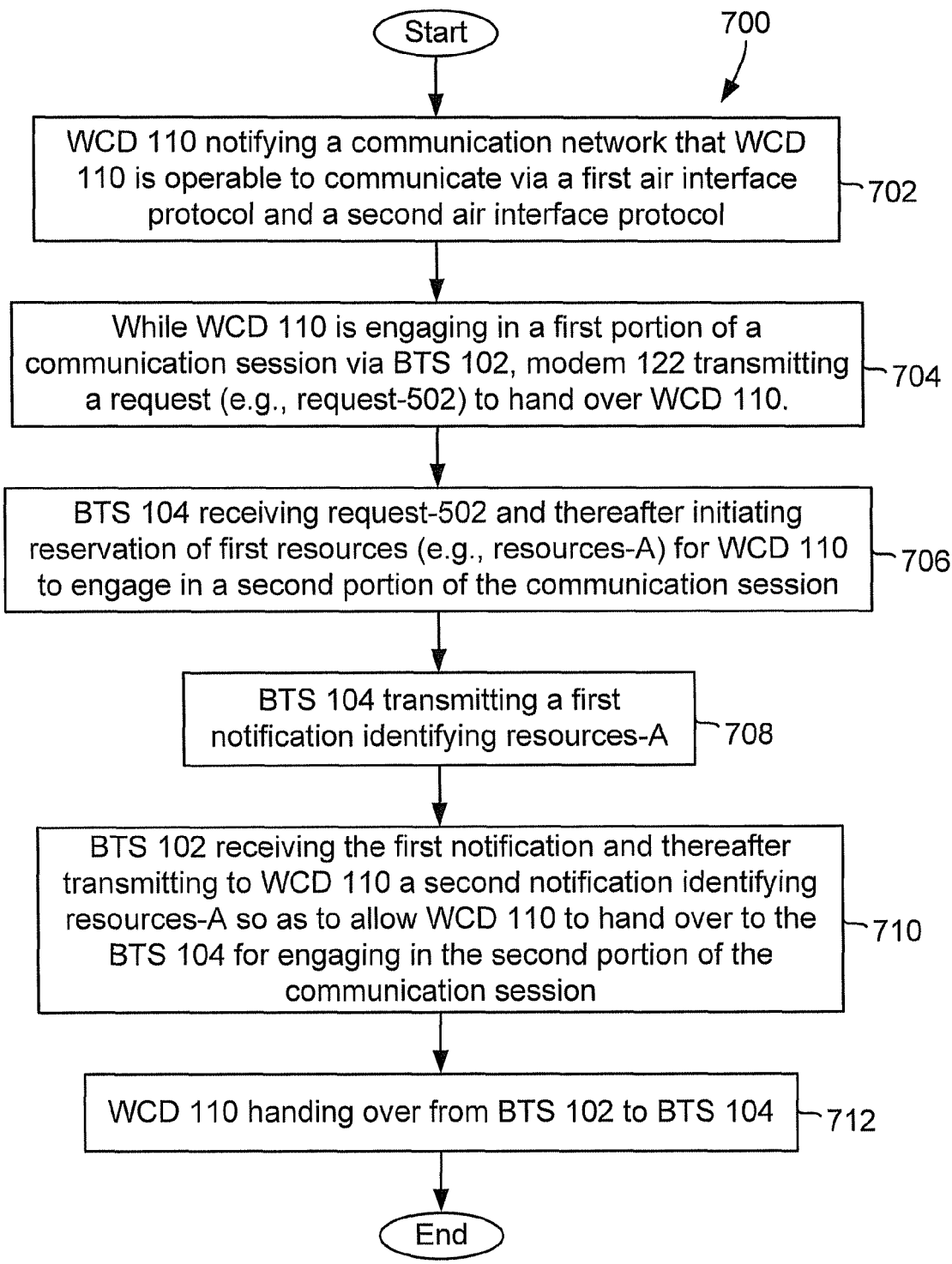
FIG. 7 is a flow chart illustrating a set of functions that may be carried out in accordance with an exemplary embodiment.

Next, FIG. 7 is a flow chart provided to illustrate a set of functions 700 that may be carried out in accordance with an exemplary embodiment described herein. In this regard, the set of functions 700 may be carried out via communications network 100. One or more functions of set 700 may be performed while WCD 110 is engaging in a first portion of a communication session via BTS 102. The communication session may be a voice call, a data session to stream video to WCD 110, or some other type of communication session. The first portion of the communication session may be carried out in accordance with the first air interface protocol. For purposes of describing FIG. 7 and by way of example only, the first air interface protocol is the WiMAX protocol and the second air interface protocol is the Ev-DO protocol.

Block 702 includes WCD 110 notifying a communications network (e.g., network 100) that WCD 110 is operable to communicate via a first air interface protocol (e.g., WiMAX) and a second air interface protocol (e.g., Ev-DO). As an example WCD 110 may provide such notice when it enters a cell and/or sector formed by BTS 102 and/or BTS 104. Communications network 100 may store data at AAA server 136 or at some other device data that indicates WCD is operable to communicate via the first and second air interface protocols. Alternatively, WCD 110 may not notify communications network 100 that it is operable to communicate via the first and second air interface protocols. Instead, AAA server 136 may notify BTSs 102, 104, gateway 132, and/or switch 134 that WCD 110 is operable to communicate via the first and second air interface protocols. Furthermore and alternatively, BTSs 102, 104 may transfer to each other data that indicates WCD 110 is operable to communicate via the first and second air interface protocols.

Next, block 704 includes, while WCD 110 is engaging in a first portion of a communication session via BTS 102, modem 122 transmitting a request (e.g., request-502) to hand over WCD 110. Transmission of request-502 may be carried out in response to any of a variety of events. For example, BTS 102 may transmit request-502 in response to BTS 102: (i) making a determination that forward-link communications occurring from BTS 102 exceed a forward-link communications threshold, and (ii) in response to determining that this threshold is exceeded, making a determination that WCD 110 should be handed over to BTS 104. As another example, BTS 102 may transmit request-502 in response to BTS 102: (i) making a determination that backhaul communications from BTS 102 exceed a backhaul communications threshold, and (ii) in response to determining that this threshold is exceeded, making a determination that WCD 110 should be handed over to BTS 104. Transmission of request-502, as well as the forward-link communications from BTS 102, may be carried out in accordance with the second air interface protocol (e.g., Ev-DO). The forward-link communications threshold and/or the backhaul communications threshold may be contained in data storage device 156.

Next, block 706 includes BTS 104 receiving request-502 and thereafter initiating reservation of resources (e.g., resources-A, described above) for WCD 110 to engage in a second portion of the communication session via BTS 104. Initiating reservation of resources-A may occur in response to BTS 104, in particular transceiver 170, receiving request-502 and/or transceiver 170 providing request-502 to processor 174. Initiating reservation of resources-A may include BTS 104 reserving resources-A.

Next, block 708 includes BTS 104 transmitting a first notification identifying resources-A. In one respect, transmission of the first notification identifying resources-A is carried out in accordance with the second air interface protocol (e.g., Ev-DO). In another respect, transmission of the first notification identifying resources-A is carried out via the backhaul network 140.

Next, block 710 includes BTS 102 receiving the first notification identifying resources-A and, thereafter, BTS 102 transmitting to WCD 110 a second notification identifying resources-A so as to allow WCD 110 to hand over to BTS 104 for engaging in the second portion of the communication session. Transmission of the second notification identifying resources-A is carried out in accordance with the first air interface protocol (e.g., WiMAX).

Next, block 712 includes WCD 110 handing over from BTS 102 to BTS 104. Upon and/or after handing off to BTS 104, WCD 110 may engage in the second portion of the communication session via BTS 104. The second portion of the communication session is carried out in accordance with the second air interface protocol (e.g., Ev-DO). During the second portion of the communication session, forward-link communications destined for WCD 110 are transmitted to WCD 110 via transceiver 170 and reverse-link communications transmitted from WCD 110 may be received by transceiver 170 and sent via backhaul network 140 to core network 130 for routing the reverse-link communications towards their destination.

Additional functions may be carried out after WCD 110 hands over to BTS 104 at block 712. Examples of these additional functions are shown in FIGS. 9 to 12.

Figure 8:
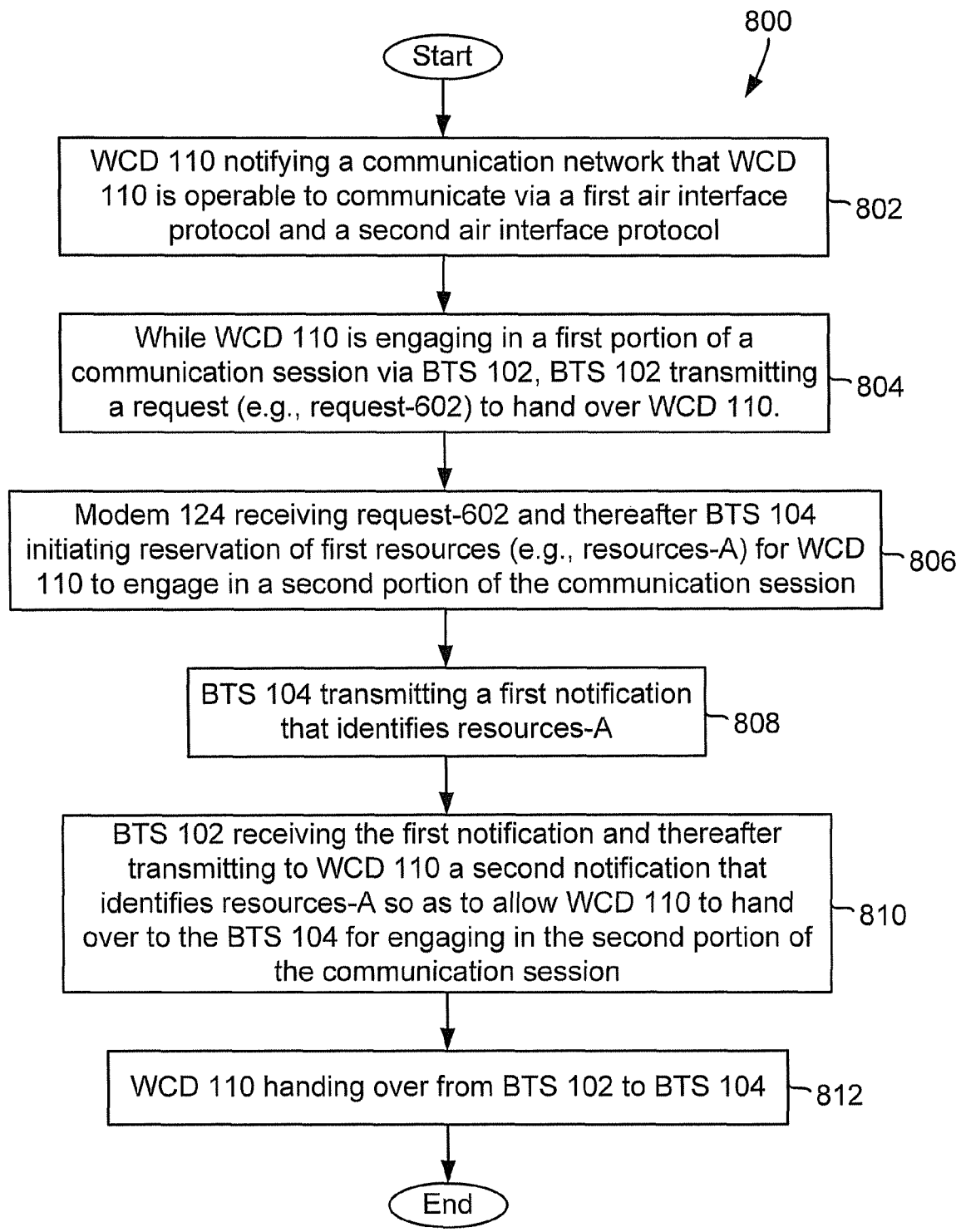
FIG. 8 is a flow chart illustrating another set of functions that may be carried out in accordance with an exemplary embodiment.

Next, FIG. 8 is a flow chart provided to illustrate a set of functions 800 that may be carried out in accordance with an exemplary embodiment described herein. In this regard, the set of functions 800 may be carried out via communications network 100. One or more functions of set 800 may be performed while WCD 110 is engaging in a first portion of a communication session via BTS 102. The communication session may be a voice call, a data session to stream video to WCD 110, or some other type of communication session. The first portion of the communication session may be carried out in accordance with the first air interface protocol. For purposes of describing FIG. 8 and by way of example only, the first air interface protocol is the WiMAX protocol and the second air interface protocol is the Ev-DO protocol.

Block 802 includes WCD 110 notifying a communications network (e.g., network 100) that WCD 110 is operable to communicate via a first air interface protocol (e.g., WiMAX) and a second air interface protocol (e.g., Ev-DO). As an example, WCD 110 may provide such notice when it enters a cell and/or sector formed by BTS 102 and/or BTS 104. Communications network 100 may store data at AAA server 136 or at some other device data that indicates WCD is operable to communicate via the first and second air interface protocols. Alternatively, WCD 110 may not notify communications network 100 that it is operable to communicate via the first and second air interface protocols. Instead, AAA server 136 may notify BTSs 102, 104, gateway 132, and/or switch 134 that WCD 110 is operable to communicate via the first and second air interface protocols. Furthermore and alternatively, BTSs 102, 104 may transfer to each other data that indicates WCD 110 is operable to communicate via the first and second air interface protocols.

Next, block 804 includes, while WCD 110 is engaging in a first portion of a communication session via BTS 102, BTS 102 transmitting a request (e.g., request-602) to handover WCD 110. Transmission of request-602 may be carried out in response to any of a variety of events. For example, BTS 102 may transmit request-602 in response to BTS 102 (i) making a determination that forward-link communications occurring from BTS 102 exceed a forward-link communications threshold, and (ii) in response to determining that this threshold is exceeded, making a determination that WCD 110 should be handed over. As another example, BTS 102 may transmit request-602 in response to BTS 102 (i) making a determination that backhaul communications from BTS 102 exceed a backhaul communications threshold, and (ii) in response to determining that this threshold is exceeded, making a determination that WCD 110 should be handed over. Transmission of request-602, as well as the forward-link communications from BTS 102, may be carried out in accordance with the first air interface protocol.

Next, block 806 includes modem 124 receiving request-602 and thereafter BTS 104 initiating reservation of resources (e.g., resources-A, described above) for WCD 110 to engage in a second portion of the communication session. Initiating reservation of the resources may occur in response to modem 124 receiving request-602 and/or modem 124 providing request-602 to processor 174. Initiating reservation of resources-A may include BTS 104 reserving resources-A.

Next, block 808 includes BTS 104 transmitting a first notification that identifies resources-A. Transmission of the first notification is carried out in accordance with the second air interface protocol (e.g., Ev-DO).

Next, block 810 includes BTS 102 receiving the first notification and thereafter transmitting to WCD 110 a second notification that identifies resources-A so as to allow WCD 110 to hand over to BTS 104 for engaging in the second portion of the communication session. The second notification identifying resources-A is carried out in accordance with the first air interface protocol.

Next, block 812 includes WCD 110 handing over from BTS 102 to BTS 104. Upon and/or after handing off to BTS 104, WCD 110 may engage in the second portion of the communication session via BTS 104. During the second portion of the communication session, forward-link communications destined for WCD 110 are transmitted to WCD 110 via transceiver 170 and reverse-link communications transmitted from WCD 110 may be received by transceiver 170 and sent via backhaul network 140 to core network 130 for routing the reverse-link communications towards their destination. The second portion of the communication session is carried out in accordance with the second air interface protocol.

Additional functions may be carried out after WCD 110 hands over to BTS 104 at block 812. Examples of these additional functions are shown in FIGS. 9 to 12.

B. Handover of WCD from Second BTS to First BTS

Figure 9:
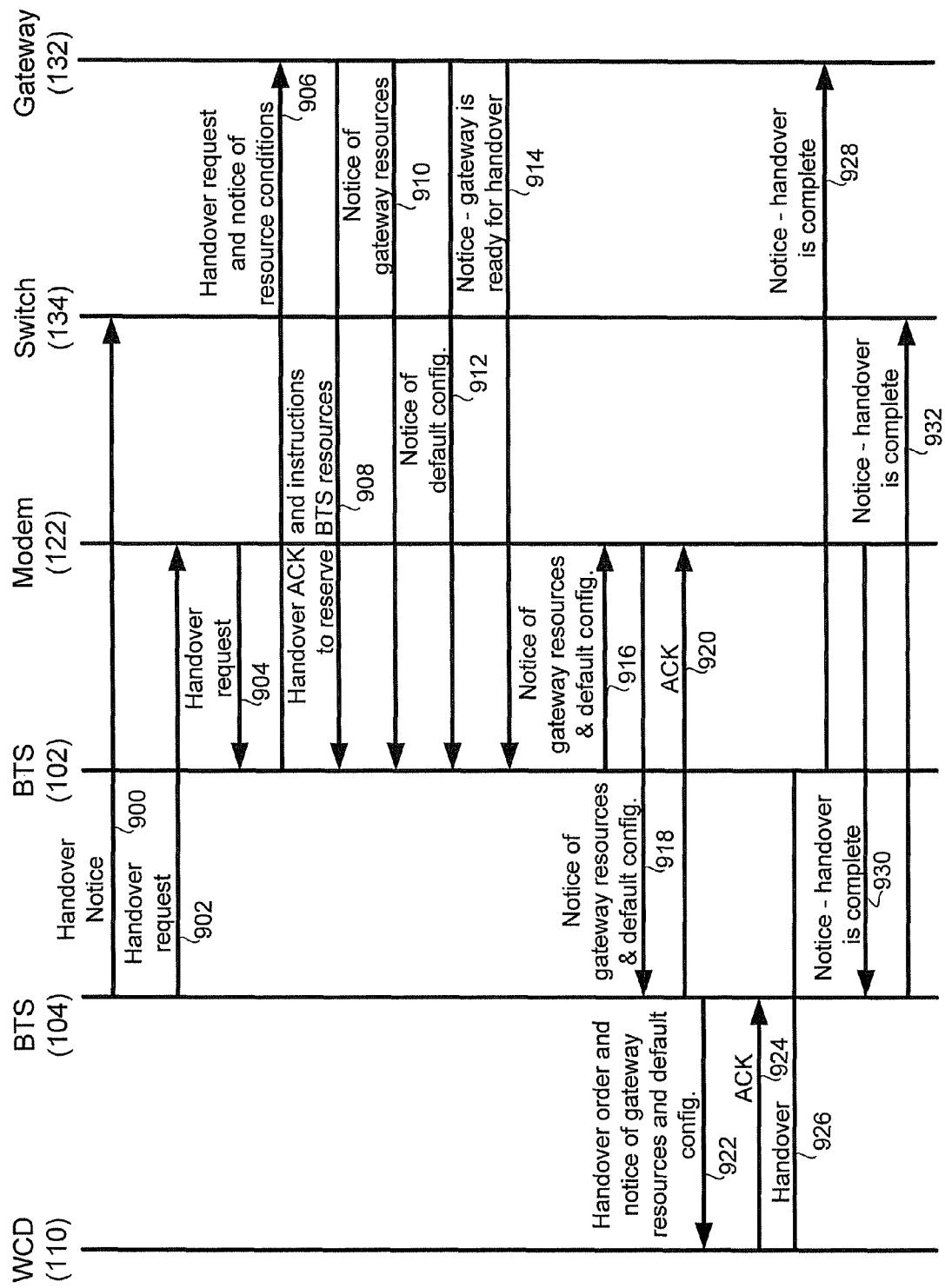
FIG. 9 is a flow diagram depicting another exemplary set of functions that may be carried out in accordance with an exemplary embodiment.

FIG. 9 is a flow diagram depicting an exemplary set of functions that may be carried out in accordance with an exemplary embodiment. The devices that carry out a portion of at least one of these functions are listed at the top of FIG. 9. Each of the functions is represented by a line and some text. For some of the functions, the line has an arrow at one end to point to the device that receives a message from another device. A person having ordinary skill in the art will understand that one or more of the messages described below with respect to FIG. 9 may comprise one or more messages, and that two or more of the functions may be combined. Additionally, the person having ordinary skill in the art will understand that transmission of one or more of the messages described below with respect to FIG. 9 may be transmitted as a plurality of data packets comprising a respective portion of the message, and a device that receives the plurality of packets may recover the contents of each received packet and then reconstruct the message.

At line 900, BTS 104 transmits to switch 134 a message to provide notice that WCD 110 is going to hand over to another BTS. The notification message of line 500 may identify the BTS (e.g., BTS 102) to which WCD 110 is going to hand over. BTS 104 may send the notification message of line 500 in response to BTS 104 making a determination that WCD 110 should be handed over. In another respect, instead of BTS 104 transmitting the notification message of line 900, switch 134 may make a determination that WCD 110 should be handed over to BTS 102 and responsively transmit to BTS 104 a notification message that WCD 110 should be handed over. In yet another respect, WCD 110 may determine that it should handover to BTS 102 and notify BTS 104 that it is going to handover.

Next, at line 902, BTS 104 transmits to modem 122 a handover request message. Transmission of the handover request message of line 902 may be carried out in accordance with the second air interface protocol (e.g., the Ev-DO protocol). Data storage 176 may contain program instructions that are executable to cause transceiver 170 to transmit the handover request message of line 902. Processor 174 may execute these program instructions in response to determining that WCD 110 should be handed over to another BTS. In this regard, for example, processor 174 may make this determination in response to receiving a handover request from WCD 110 or, in the alternative arrangement, the notification message of line 900 sent by switch 134. Transmission of the handover request message of line 902 may occur prior to, simultaneous to, or after transmission of the notification message of line 900. For purposes of this description, this handover request message sent at line 902 is referred to as "request-902."

Next, at line 904, modem 122 transmits to and/or within BTS 102 a handover request message. In this regard, modem 122 may transmit to processor 154 the handover request message received from BTS 104 at line 902. The transmission of the handover request message of line 904 may occur via connection mechanism 158.

Next, at line 906, BTS 102 transmits to gateway 132 a message to provide a handover request and notice of resource conditions. As an example, these resource conditions may connection ID availability, RF slot utilization, and/or some other resource condition. The transmission of the message of line 906 may be carried out via backhaul interface 152 and backhaul network 138. Data storage 156 may contain program instructions that are executable to cause backhaul interface 152 to transmit the message of line 906 to backhaul network 138. Processor 154 may execute these program instructions in response to BTS 102 receiving the message of line 904.

Next, at line 908, gateway 132 transmits to BTS 102 a message to acknowledge receipt of the handover request and to provide instructions for BTS 102 to reserve resources for WCD 110. For purposes of this description, the resources to be reserved by BTS 104 are referred to as "resources-B." As an example, resources-B may include a connection ID, an RF slot, and/or some other BTS resource. Transmission of the message of line 908 may be carried out via backhaul network 138. A data storage device (not shown) at gateway 132 may contain program instructions that are executable to cause gateway 132 to transmit the message of line 908 to backhaul network 138. A processor (not shown) at gateway 132 may execute these program instructions in response to gateway 132 receiving the message of line 906.

Next, at line 910, gateway 132 transmits to BTS 102 a message to provide notice of the gateway resources reserved by gateway 132. Transmission of the message of line 910 may be carried out via backhaul network 138. The data storage device at gateway 132 may contain program instructions that are executable to cause gateway 132 to transmit the message of line 910. The processor at gateway 132 may execute these program instructions in response to gateway 132 receiving the message of line 906 and/or upon reserving the gateway resources. The gateway resources reserved by gateway 132 may comprise resources that are reserved for use by WCD 110 after handover of WCD 110. As an example, the gateway resource of gateway 132 may comprise a connection ID and/or resources for a point-to-point protocol session. Other examples of the gateway resources are also possible.

Next, at line 912, gateway 132 transmits to BTS 102 a message to provide notice of a default configuration. In general, the default configuration may be identified by a variety of data, such as data that indicates how BTS 102 is operating and/or data that indicates how WCD 110 should operate. In particular, the default configuration may be identified by data that indicates attributes WCD 110 should use to perform handover, a type of encryption used by BTS 102 and/or to be used by WCD 110, and/or some other type of data. Transmission of the message of line 912 may be carried out via backhaul network 138. The data storage device at gateway 132 may contain program instructions that are executable to cause gateway 132 to transmit the message of line 912 to backhaul network 138. The processor at gateway 132 may execute these program instructions in response to gateway 132 receiving the message of line 906 and/or upon determining the default configuration.

Next, at line 914, gateway 132 transmits to BTS 102 a message to provide notice that gateway 132 is ready for handover of WCD 110. Transmission of the notification message of line 914 may be carried out via backhaul network 138. The data storage device at gateway 132 may contain program instructions that are executable to cause gateway 132 to transmit the message of line 914 to backhaul network 138. The processor at gateway 132 may execute these program instructions in response to gateway 132 sending the messages of lines 908, 910, 912 and/or determining that it is ready for handover of WCD 110.

Next, at line 916, BTS 102 transmits to modem 122 a message to provide notice of the gateway resources and the default configuration. Transmission of the notification message of line 916 may occur from processor 154 to modem 122 via connection mechanism 158. Data storage 156 may contain program instructions that cause processor 154 to transmit the notification message of line 916. Processor 154 may execute these program instructions in response to processor 154 receiving the notification message of line 914.

Next, at line 918, modem 122 transmits to BTS 104 a message to provide notice of the gateway resources of gateway 132 and the default configuration of WCD 110. The transmission of the notification message of line 918 is carried out in accordance with the second air interface protocol.

Transceiver 170 may receive the notification message of line 918 and responsively provide the received notification message to processor 174.

Next, at line 920, BTS 104 transmits to modem 122 a message to acknowledge that BTS 104 has received the notification message of line 918. The transmission of the acknowledgment message of line 920 is carried out in accordance with the second air interface protocol. The acknowledgment message of line 920 may comprise a plurality of acknowledgment messages, such as a message to acknowledge receipt of the notice of the gateway resources and another message to acknowledge receipt of the notice of the default configuration.

Next, at line 922, BTS 104 transmits to WCD 110 a message comprising a handover order and notice of the gateway resources and the default configuration. Transmission of the message of line 922 is carried out in accordance with the second air interface protocol. Data storage 176 may contain program instructions that are executable to cause transceiver 170 to transmit the message of line 922. Processor 174 may execute these program instructions in response to BTS 104 receiving the notification message of line 918.

Next, at line 924, WCD 110 transmits to BTS 104 a message to acknowledge that WCD 110 has received the message of line 922. The transmission of the acknowledgment message of line 924 is carried out in accordance with the second air interface protocol. The acknowledgment message of line 924 may comprise a plurality of acknowledgment messages, such as a message to acknowledge receipt of the handover order, and another message to acknowledge receipt of the notice of the gateway resources and the default configuration.

Next, at line 926, WCD 110 hands over to BTS 102. Line 926 is shown without any arrows. In this regard, WCD 110 may not transmit a message to indicate that it has handed over to BTS 102. Alternatively, WCD 110 may transmit to BTS 102 a notification message that it has handed over to BTS 102.

Next, at line 928, BTS 102 transmits to gateway 132 a message to provide notice that the handover of WCD 110 is complete. Transmission of the notification message of line 928 may be carried out via backhaul network 138. Data storage 156 may contain program instructions that are executable to cause backhaul interface 152 to transmit the notification message of line 928. Processor 154 may execute these program instructions upon determining that WCD 110 has handed over to BTS 102.

Next, at line 930, modem 122 transmits to BTS 104 a message to provide notice that the handover of WCD 110 is complete. Transmission of the notification message of line 930 may be carried out in accordance with the second air interface protocol. Data storage 156 may contain program instructions that are executable to cause modem 122 to transmit the notification message of line 930. Processor 154 may execute these program instructions in response to WCD 110 handing over to BTS 102 at line 926. Transceiver 170 may receive the notification message of line 930 and responsively provide the received notification message to processor 174.

Next, at line 932, BTS 104 transmits to switch 134 a message to provide notice that the handover of WCD 110 is complete. Transmission of the notification message of line 932 may be carried out via backhaul network 140. Data storage 176 may contain program instructions that are executable to cause backhaul interface 172 to transmit the notification message of line 932. Processor 174 may execute these program instructions in response to it receiving the notification message of line 930.

Figure 10:
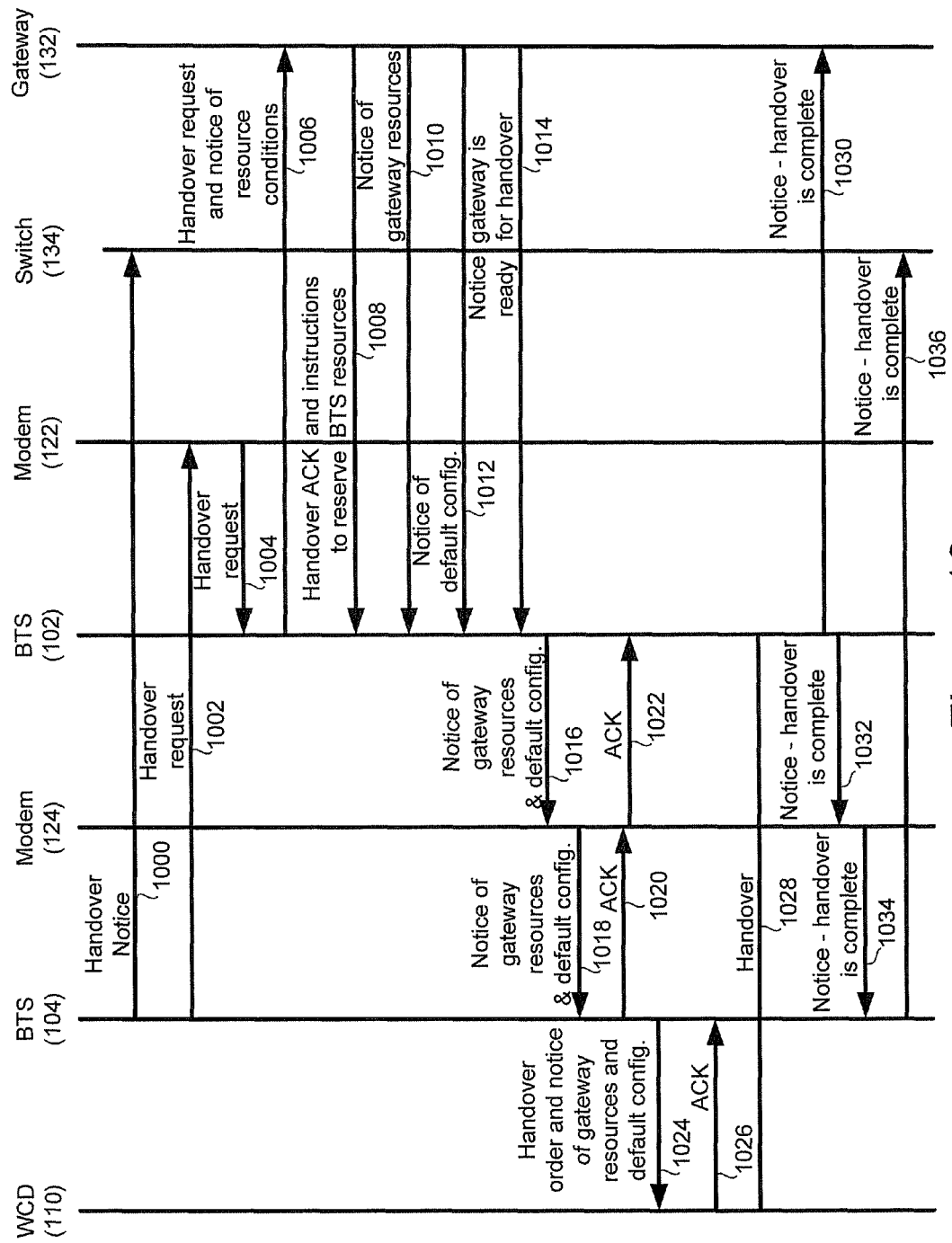
FIG. 10 is a flow diagram depicting another exemplary set of functions that may be carried out in accordance with an exemplary embodiment.

Next, FIG. 10 is a flow diagram depicting another exemplary set of functions that may be carried out in accordance with an exemplary embodiment. The devices that carry out a portion of at least one of the functions are listed at the top of FIG. 10. Each of the functions is represented by a line and some text. For some of the functions, the line has an arrow at one end to point to the device that receives a message from another device. A person having ordinary skill in the art will understand that one or more of the messages described below with respect to FIG. 10 may comprise one or more messages, and that two or more of the functions may be combined. Additionally, the person having ordinary skill in the art will understand that transmission of one or more of the messages described below with respect to FIG. 10 may be transmitted as a plurality of data packets comprising a respective portion of the message, and a device that receives the plurality of packets may recover the contents of each received packet and then reconstruct the message.

At line 1000, BTS 104 transmits to switch 134 a message to provide notice that WCD 110 is going to hand over to another BTS. The notification message of line 1000 may identify the BTS (e.g., BTS 102) to which WCD 110 is going to hand over. BTS 104 may send the notification message of line 1000 in response to BTS 104 making a determination that WCD 110 should be handed over. In another respect, instead of BTS 104 transmitting the notification message of line 1000, switch 134 may make a determination that WCD 110 should be handed over to BTS 102 and responsively transmit to BTS 104 a notification message that WCD 110 should be handed over. In yet another respect, WCD 110 may determine that it should handover to BTS 102 and notify BTS 104 that it is going to handover.

Next, at line 1002, BTS 104 transmits to modem 122 a handover request message. For purposes of this description, this request will be referred to as "request-1002." Request-1002 may be identical to request-902. Transmission of the handover request message of line 1002 may be carried out in accordance with the second air interface protocol (e.g., the Ev-DO protocol). Data storage 176 may contain program instructions that are executable to cause transceiver 170 to transmit the handover request message of line 1002. Processor 174 may execute these program instructions in response to determining that WCD 110 should be handed over to another BTS. In this regard, for example, processor 174 may make this determination in response to receiving a handover request from WCD 110 or, in the alternative arrangement, the notification message of line 1000 sent by switch 134. Transmission of the handover request message of line 1002 may occur prior to, simultaneous to, or after transmission of the notification message of line 1000.

Next, at line 1004, modem 122 transmits to and/or within BTS 102 a handover request message. In this regard, modem 122 may transmit to processor 154 the handover request message received from BTS 104 at line 1002. The transmission of the handover request message of line 1004 may occur via the connection mechanism 158.

Next, at line 1006, BTS 102 transmits to gateway 132 a message to provide a handover request and notice of resource conditions. As an example, these resource conditions may connection ID availability, RF slot utilization, and/or some other resource condition. The transmission of the message of line 1006 may be carried out via backhaul interface 152 and backhaul network 138. Data storage 156 may contain program instructions that are executable to cause backhaul interface 152 to transmit the message of line 1006 to backhaul network 138. Processor 154 may execute these program instructions in response to BTS 102 receiving the message of line 1004.

Next, at line 1008, gateway 132 transmits to BTS 102 a message to acknowledge receipt of the handover request and to provide instructions for BTS 102 to reserve resources (e.g., resources-B, described above) for WCD 110. Transmission of the message of line 1008 may be carried out via backhaul network 138. A data storage device (not shown) at gateway 132 may contain program instructions that are executable to cause gateway 132 to transmit the message of line 1008 to backhaul network 138. A processor (not shown) at gateway 132 may execute these program instructions in response to gateway 132 receiving the message of line 1006.

Next, at line 1010, gateway 132 transmits to BTS 102 a message to provide notice of the gateway resources reserved by gateway 132. Transmission of the message of line 1010 may be carried out via backhaul network 138. The data storage device at gateway 132 may contain program instructions that are executable to cause gateway 132 to transmit the message of line 1010. The processor at gateway 132 may execute these program instructions in response to gateway 132 receiving the message of line 1006 and/or upon reserving the gateway resources. The gateway resources reserved by gateway 132 may comprise resources that are reserved for use by WCD 110 after handover of WCD 110.

Next, at line 1012, gateway 132 transmits to BTS 102 a message to provide notice of a default configuration, such as the default configuration described above for line 912. Transmission of the message of line 1012 may be carried out via backhaul network 138. The data storage device at gateway 132 may contain program instructions that are executable to cause gateway 132 to transmit the message of line 1012 to backhaul network 138. The processor at gateway 132 may execute these program instructions in response to gateway 132 receiving the message of line 1006 and/or upon determining the default configuration.

Next, at line 1014, gateway 132 transmits to BTS 102 a message to provide notice that gateway 132 is ready for handover of WCD 110. Transmission of the notification message of line 1014 may be carried out via backhaul network 138. The data storage device at gateway 132 may contain program instructions that are executable to cause gateway 132 to transmit the message of line 1014 to backhaul network 138. The processor at gateway 132 may execute these program instructions in response to gateway 132 sending the messages of lines 1008, 1010, 1012 and/or determining that it is ready for handover of WCD 110.

Next, at line 1016, BTS 102 transmits to modem 124 a message to provide notice of the gateway resources and the default configuration. The transmission of the notification message of line 1016 is carried out in accordance with the first air interface protocol. Data storage 156 may contain program instructions that are executable to cause transceiver 150 to transmit the notification message of line 1016. Processor 154 may execute these program instructions in response to BTS 102 receiving the notification message of line 1014.

Next, at line 1018, modem 124 transmits to BTS 104 a message to provide notice of the gateway resources of gateway 132 and the default configuration of WCD 110. Transmission of the notification message of line 1018 may occur from modem 124 to processor 174 via connection mechanism 178.

Next, at line 1020, BTS 104 transmits to modem 124 a message to acknowledge that BTS 104 has received the notification message of line 1018. Transmission of the acknowledgement message of line 1020 may occur via connection mechanism 178.

Next, at line 1022, modem 124 transmits to BTS 102 a message to acknowledge that modem 124 received the notification message of line 1016 and/or BTS 104 received the notification message of line 1018. The transmission of the acknowledgment message of line 1022 is carried out in accordance with the second air interface protocol. The acknowledgment message of line 1022 may comprise a plurality of acknowledgment messages, such as a message to acknowledge receipt of the notice of the gateway resources, and another message to acknowledge receipt of the default configuration.

Next, at line 1024, BTS 104 transmits to WCD 110 a message comprising a handover order and notice of the gateway resources and the default configuration. Transmission of the message of line 1024 is carried out in accordance with the second air interface protocol. Data storage 176 may contain program instructions that are executable to cause transceiver 170 to transmit the message of line 1024. Processor 174 may execute these program instructions in response to BTS 104 receiving the notification message of line 1018.

Next, at line 1026, WCD 110 transmits to BTS 104 a message to acknowledge that WCD 110 has received the handover order and notification message of line 1024. The transmission of the acknowledgment message of line 1026 is carried out in accordance with the second air interface protocol. The acknowledgment message of line 1026 may comprise a plurality of acknowledgment messages, such as a message to acknowledge receipt of the handover order, and another message to acknowledge receipt of the notice of the gateway resources and the default configuration.

Next, at line 1028, WCD 110 hands over to BTS 102. Line 1028 is shown without any arrows. In this regard, WCD 110 may not transmit a message to indicate that it has handed over to BTS 102. Alternatively, WCD 110 may transmit to BTS 102 a notification message that it has handed over to BTS 102.

Next, at line 1030, BTS 102 transmits to gateway 132 a message to provide notice that the handover of WCD 110 is complete. Transmission of the notification message of line 1030 may be carried out via backhaul network 138. Data storage 156 may contain program instructions that are executable to cause backhaul interface 152 to transmit the notification message of line 1030. Processor 154 may execute these program instructions upon determining that WCD 110 has handed over to BTS 102.

Next, at line 1032, BTS 102 transmits to modem 124 a message to provide notice that the handover of WCD 110 is complete. Transmission of the notification message of line 1032 may be carried out in accordance with the first air interface protocol. Data storage 156 may contain program instructions that are executable to cause transceiver 150 to transmit the notification message of line 1032. Processor 154 may execute these program instructions upon determining that WCD 110 has handed over to BTS 102.

Next, at line 1034, modem 124 transmits to BTS 104 a message to provide notice that the handover of WCD 110 is complete. In this regard, modem 124 may transmit to processor 174 the notification message received from BTS 102 at line 1032. The transmission of the notification message of line 1034 may occur via connection mechanism 178.

Next, at line 1036, BTS 104 transmits to switch 134 a message to provide notice that the handover of WCD 110 is complete. Transmission of the notification message of line 1036 may be carried out via backhaul network 140. Data storage 176 may contain program instructions that are executable to cause backhaul interface 172 to transmit the notification message of line 1036. Processor 174 may execute these program instructions in response to it receiving the notification message of line 1034.

Figure 11:
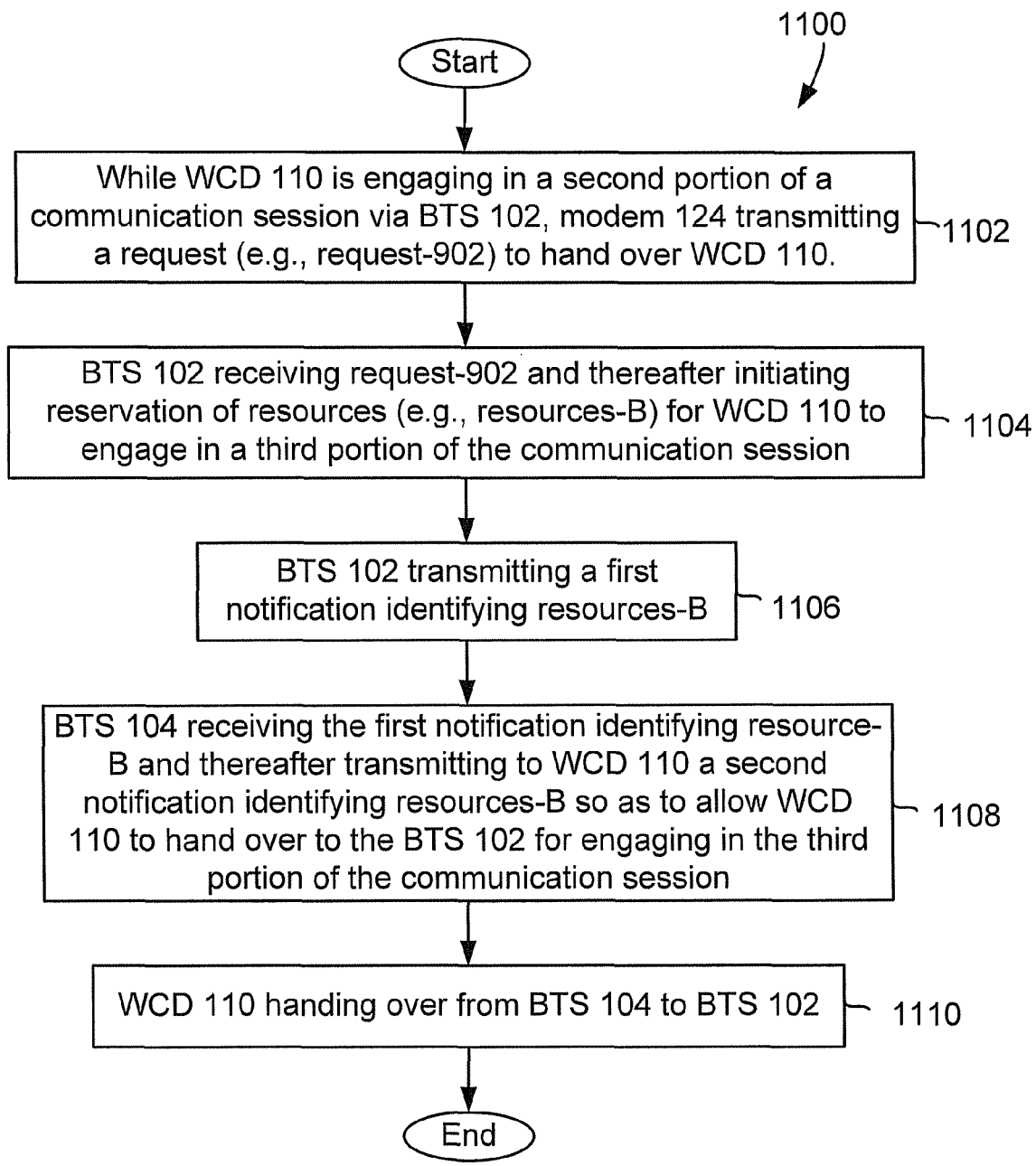
FIG. 11 is a flow chart illustrating another set of functions that may be carried out in accordance with an exemplary embodiment.

Next, FIG. 11 is a flow chart provided to illustrate a set of functions 1100 that may be carried out in accordance with an exemplary embodiment described herein. In this regard, the set of functions 1100 may be carried out via communications network 100. One or more functions of set 1100 may be performed while WCD 110 is engaging in a second portion of the communication session after WCD 110 has handed over from BTS 102 to BTS 104. In this regard, the set of functions 1100 may be carried out after performance of functions shown in FIG. 7 or functions shown in FIG. 8. The second portion of the communication session may be carried out via BTS 104 and in accordance with the second air interface protocol. For purposes of describing FIG. 11 and by way of example only, the first air interface protocol is the WiMAX protocol and the second air interface protocol is the Ev-DO protocol.

Block 1102 includes, while WCD 110 is engaging in a second portion of a communication session via BTS 104, modem 124 transmitting a request (e.g., request-902) to hand over WCD 110. Transmission of request-902 may be carried out in response to any of a variety of events. For example, BTS 104 may transmit request-902 in response to BTS 104: (i) making a determination that forward-link communications occurring from BTS 104 exceed a forward-link communications threshold, and (ii) in response to determining that this threshold is exceeded, making a determination that WCD 110 should be handed over to BTS 102. As another example, BTS 104 may transmit request-902 in response to BTS 104: (i) making a determination that backhaul communications from BTS 104 exceed a backhaul communications threshold, and (ii) in response to determining that this threshold is exceeded, making a determination that WCD 110 should be handed over to BTS 102. Transmission of request-902, as well as the forward-link communications from BTS 104, may be carried out in accordance with the second air interface protocol (e.g., Ev-DO). The forward-link communications threshold and/or the backhaul communications threshold may be contained in data storage device 156.

Next, block 1104 includes BTS 102 receiving request-902 and thereafter initiating reservation of resources (e.g., resources-B) for WCD 110 to engage in a second portion of the communication session via BTS 102. Initiating reservation of resources-B may occur in response to BTS 102, in particular transceiver 150, receiving request-902 and/or transceiver 150 providing request-902 to processor 154. Initiating reservation of resources-B may include BTS 102 reserving resources-B.

Next, block 1106 includes BTS 102 transmitting a first notification identifying resources-B. In one respect, transmission of the first notification identifying resources-B is carried out in accordance with the first air interface protocol (e.g., WiMAX). In another respect, transmission of the first notification identifying resources-B is carried out via the backhaul network 138.

Next, block 1108 includes BTS 104 receiving the first notification identifying resources-B and, thereafter, BTS 104 transmitting to WCD 110 a second notification identifying resources-B so as to allow WCD 110 to hand over to BTS 102 for engaging in the third portion of the communication session. Transmission of the second notification identifying resources-B is carried out in accordance with the second air interface protocol (e.g., Ev-DO).

Next, block 1110 includes WCD 110 handing over from BTS 104 to BTS 102. Upon and/or after handing off to BTS 102, WCD 110 may engage in the third portion of the communication session via BTS 102. During the third portion of the communication session, forward-link communications destined for WCD 110 are transmitted to WCD 110 via transceiver 150 and reverse-link communications transmitted from WCD 110 may be received by transceiver 150 and sent via backhaul network 138 to core network 130 for routing the reverse-link communications towards their destination. The third portion of the communication session is carried out in accordance with the first air interface protocol (e.g., WiMAX).

Figure 12:
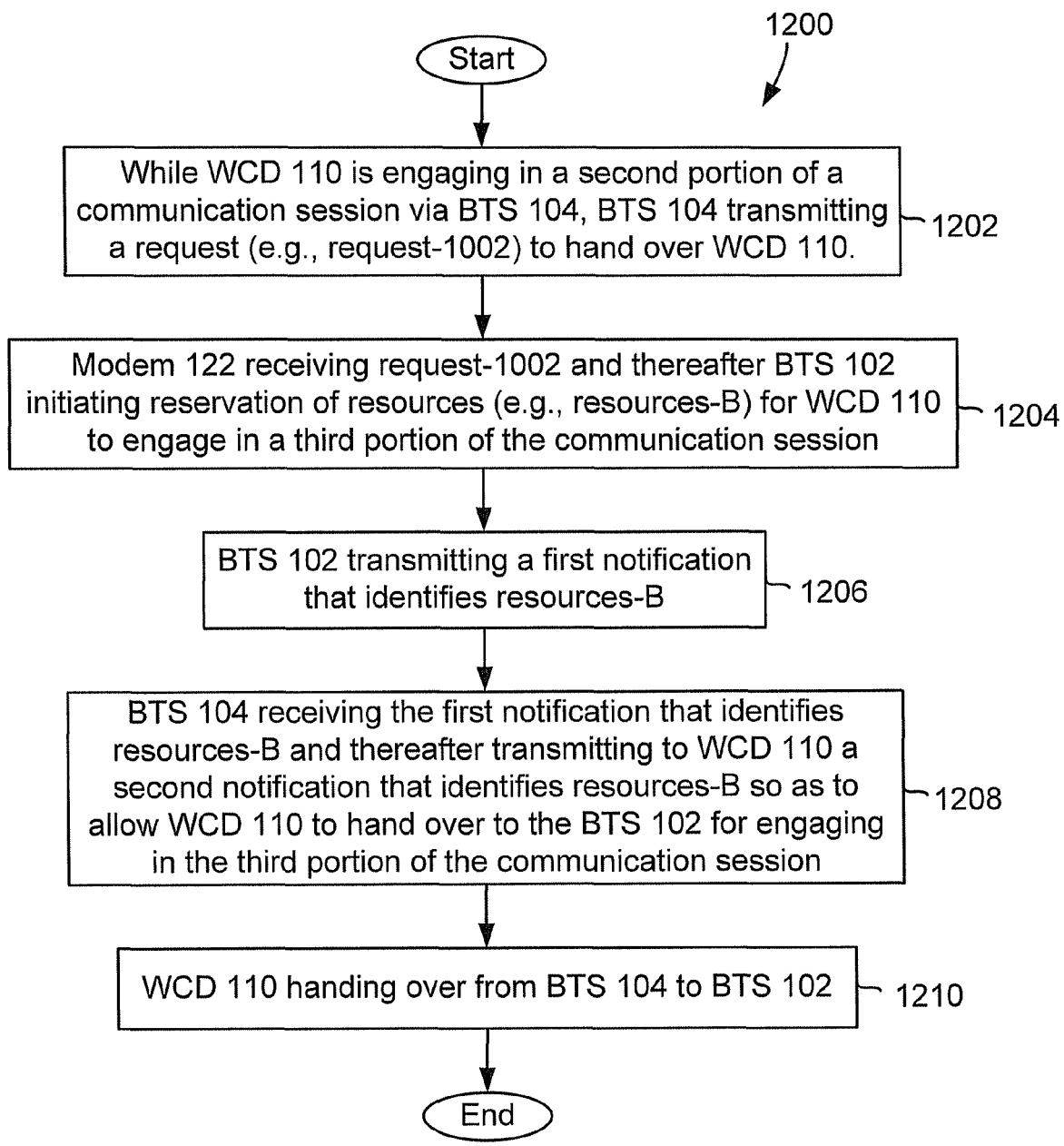
FIG. 12 is a flow chart illustrating another set of functions that may be carried out in accordance with an exemplary embodiment.

Next, FIG. 12 is a flow chart provided to illustrate a set of functions 1200 that may be carried out in accordance with an exemplary embodiment described herein. In this regard, the set of functions 1200 may be carried out via communications network 100. One or more functions of set 1200 may be performed while WCD 110 is engaging in a second portion of the communication session after WCD 110 has handed over from BTS 102 to BTS 104. In this regard, the set of functions 1200 may be carried out after performance of functions shown in FIG. 7 or functions shown in FIG. 8. The second portion of the communication session may be carried out via BTS 104 and in accordance with the second air interface protocol. For purposes of describing FIG. 12 and by way of example only, the first air interface protocol is the WiMAX protocol and the second air interface protocol is the Ev-DO protocol.

Block 1202 includes, while WCD 110 is engaging in a second portion of a communication session via BTS 104, BTS 104 transmitting a request (e.g., request-1002) to handover WCD 110. Transmission of request-1002 may be carried out in response to any of a variety of events. For example, BTS 104 may transmit request-1002 in response to BTS 104 (i) making a determination that forward-link communications occurring from BTS 104 exceed a forward-link communications threshold, and (ii) in response to determining that this threshold is exceeded, making a determination that WCD 110 should be handed over. As another example, BTS 104 may transmit request-1002 in response to BTS 104 (i) making a determination that backhaul communications from BTS 104 exceed a backhaul communications threshold, and (ii) in response to determining that this threshold is exceeded, making a determination that WCD 110 should be handed over. Transmission of request-1002, as well as the forward-link communications from BTS 104, may be carried out in accordance with the second air interface protocol.

Next, block 1204 includes modem 122 receiving request-1002 and thereafter BTS 102 initiating reservation of resources (e.g., resources-B, described above) for WCD 110 to engage in a third portion of the communication session. Initiating reservation of the resources may occur in response to modem 122 receiving request-1002 and/or modem 122 providing request-1002 to processor 154. Initiating reservation of resources-B may include BTS 102 reserving resources-B.

Next, block 1206 includes BTS 102 transmitting a first notification that identifies resources-B. Transmission of this notification that identifies resources-B is carried out in accordance with the second air interface protocol (e.g., Ev-DO).

Next, block 1208 includes BTS 104 receiving the first notification that identifies resources-B and thereafter transmitting to WCD 110 a second notification that identifies resources-B so as to allow WCD 110 to hand over to BTS 102 for engaging in the third portion of the communication session. The second notification identifying resources-B is carried out in accordance with the second air interface protocol.

Next, block 1210 includes WCD 110 handing over from BTS 104 to BTS 102. Upon and/or after handing off to BTS 102, WCD 110 may engage in the third portion of the communication session via BTS 102. During the third portion of the communication session, forward-link communications destined for WCD 110 are transmitted to WCD 110 via transceiver 150 and reverse-link communications transmitted from WCD 110 may be received by transceiver 150 and sent via backhaul network 138 to core network 130 for routing the reverse-link communications towards their destination. The third portion of the communication session is carried out in accordance with the first air interface protocol (e.g., WiMAX).

A person having ordinary skill in the art will understand that WCD 110 may repeatedly hand over between BTS 104 and BTS 102 using the functions described above.

3. Conclusion

Exemplary embodiments of the present invention have been described above. Those skilled in the art will understand, however, that changes and modifications may be made to the embodiments described without departing from the true scope and spirit of the present invention, which is defined by the claims.

In accordance with the embodiments described above, a person having ordinary skill in the art will understand that one or more other WCDs in addition to WCD 110 may be handed over from BTS 102 to BTS 104 and/or from BTS 104 to BTS 102 by using the exemplary functions described herein. Additionally, a person having ordinary skill in the art will understand that the exemplary first air interface protocol may be a protocol other than the WiMAX protocol and that the second exemplary air interface protocol may be a protocol other than the Ev-DO protocol so long as the second air interface protocol is different than the first air interface protocol.

Finally, the word "exemplary" is used herein to mean "serving as an example, instance, or illustration." Any embodiment described herein as "exemplary" is not necessarily to be construed as preferred or advantageous over other embodiments.

We claim:

1. A system comprising:
    a first base transceiver station that serves a first plurality of wireless communication devices, wherein the first base transceiver station transmits wireless communications to the first plurality of wireless communication devices in accordance with a first air interface protocol and receives wireless communications transmitted from the first plurality of wireless devices in accordance with the first air interface, protocol; and
    a second base transceiver station that serves a second plurality of wireless communication devices, wherein the second base transceiver station transmits wireless communications to the second plurality of wireless communication devices in accordance with a second air interface protocol and receives wireless communications transmitted from the second plurality of wireless devices in accordance with the second air interface protocol,
    wherein the first base transceiver station comprises a first modem and first antenna for wireless transmission of first data from the first base transceiver station to the second base transceiver station in accordance with the second air interface protocol that the second base transceiver station uses to receive wireless communications from the second plurality of wireless communication devices, and
    wherein the second base transceiver station comprises a second modem and second antenna for wireless transmission of second data from the second base transceiver station to the first base transceiver station in accordance with the first air interface protocol that the first base transceiver station uses to receive wireless communications from the first plurality of wireless communication devices.

2. The system of claim 1,
    wherein a given wireless communication device is a wireless communication device of the first plurality of wireless communication devices and of the second plurality of wireless communication devices,
    wherein the given wireless communication device engages in a first portion of a communication session via the first base transceiver station,
    wherein the first portion of the communication session is carried out in accordance with the first air interface protocol, and
    wherein the data transferred between the first base transceiver station and the second base transceiver station comprises a request to hand over the given wireless communication device to the second base transceiver station.

3. The system of claim 2,
    wherein the data transferred between the first base transceiver station and the second base transceiver station further comprises data that identifies resources to be used by the given wireless communication device,
    wherein, after the given wireless communication device hands over to the second base transceiver station, the given wireless communication device uses the identified resources to engage in a second portion of the communication session via the second base transceiver station, and
    wherein the second portion of the communication session is carried out in accordance with the second air interface protocol.

4. The system of claim 3, wherein the first base transceiver station and the second base transceiver station each refer to a given set of authentication, authorization, and accounting (AAA) data such that handover of the given wireless communication device to the second base transceiver station does not require re-authentication and or reauthorization of the given wireless communication device.

5. The system of claim 2,
    wherein the first base transceiver station and the second base transceiver station each comprise a respective interface to a backhaul network,
    wherein the first base transceiver station and the second base transceiver station transfer data between each other via the backhaul network,
    wherein the data transferred via the backhaul network comprises data that identifies resources to be used by the given wireless communication device,
    wherein, after the given wireless communication device hands over to the second base transceiver station, the given wireless communication device uses the identified resources to engage in a second portion of the communication session via the second base transceiver station, and
    wherein the second portion of the communication session is carried out in accordance with the second air interface protocol.

6. The system of claim 2,
    wherein the second data transferred between the first base transceiver station and the second base transceiver station comprises data that identifies first resources to be used by the given wireless communication device,
    wherein, after the given wireless communication device hands over to the second base transceiver station, the given wireless communication device uses the first resources to engage in a second portion of the communication session via the second base transceiver station, and wherein the second portion of the communication session is carried out in accordance with the second air interface protocol.

7. The system of claim 6, wherein the second data transferred between the first base transceiver station and the second base transceiver station comprises a request to hand over the given wireless communication device to the first base transceiver station, wherein the second data transferred between the first base transceiver station and the second base transceiver station comprises data that identifies second resources to be used by the given wireless communication device, wherein, after the given wireless communication device hands over to the first base transceiver station, the given wireless communication device uses the second resources to engage in a third portion of the communication session via the first base transceiver station, and wherein the third portion of the communication session is carried out in accordance with the first air interface protocol.

8. The system of claim 1, wherein a given wireless communication device is a wireless communication device of the first plurality of wireless communication devices and of the second plurality of wireless communication devices, wherein the first base transceiver station further comprises (i) a first processor, and (ii) a first data storage device that contains first computer-readable program instructions that are executable by the first processor, wherein the second base transceiver station comprises (i) a second processor, and (ii) a second data storage device that contains second computer-readable program instructions that are executable by the second processor, wherein the first program instructions include instructions that cause the first base transceiver station to transmit a request to hand over the given wireless communication device to the second base transceiver station, wherein the first base transceiver station transmits the request while the given wireless communication device engages in a first portion of a communication session via the first base transceiver station, wherein the first portion of the communication session is carried out in accordance with the first air interface protocol, wherein the second program instructions include instructions that cause the second base transceiver station to initiate reservation of resources comprising resources for the given wireless communication device to engage in a second portion of the communication session via the second base transceiver station, wherein the second base transceiver station initiates reservation of the resources after the second base transceiver station receives the request to hand over the given wireless communication device, wherein the second program instructions include instructions that cause the second base transceiver station to transmit to the first base transceiver station a first notification that identifies the resources, wherein the first program instructions include instructions that cause the first base transceiver station to transmit to the given wireless communication device a second notification that identifies the resources so as to allow the given wireless communication device to engage in the second portion of the communication session via the second base transceiver station, wherein the second portion of the communication session is carried out in accordance with the second air interface protocol, and wherein transmission of the second notification is carried out in accordance with the first air interface protocol.

9. The system of claim 1, wherein a given wireless communication device is a wireless communication device of the first plurality of wireless communication devices and of the second plurality of wireless communication devices, wherein the given wireless communication device engages in a first portion of a communication session via the first base transceiver station, wherein the first base transceiver station further comprises (i) a first processor, and (ii) a first data storage device that contains first computer-readable program instructions that are executable by the first processor, wherein the second base transceiver station further comprises (i) a second processor, and (ii) a second data storage device that contains second computer-readable program instructions that are executable by the second processor, wherein the first program instructions are executable to cause the first modem to transfer the first data, wherein the first data includes a request to handover the given wireless communication device to the second base transceiver station, wherein the first modem transfers the first data while the given wireless communication device engages in a first portion of a communication session via the first base transceiver station, wherein the second program instructions include instructions that cause the second base transceiver station to initiate reservation of resources comprising resources for the given wireless communication device to engage in a second portion of the communication session via the second base transceiver station, wherein the second base transceiver station initiates reservation of the resources after the second base transceiver station receives the request to hand over the given wireless communication device, wherein the second program instructions include instructions that cause the second base transceiver station to transmit to the first base transceiver station a first notification that identifies the resources, wherein the first program instructions include instructions that cause the first base transceiver station to transmit to the given wireless communication device a second notification that identifies the resources so as to allow the given wireless communication device to engage in the second portion of the communication session via the second base transceiver station, wherein the second portion of the communication session is carried out in accordance with the second air interface protocol, and wherein transmission of the second notification is carried out in accordance with the first air interface protocol.

10. A method comprising:

while a given wireless communication device is engaging in a first portion of a communication session via a first base transceiver station configured to transmit wireless communications to a first plurality of wireless communication devices in accordance with a first air interface protocol and to receive wireless communications transmitted from the first plurality of wireless communication devices in accordance with the first air interface protocol, a modem and antenna of the first base transceiver station wirelessly transmitting to a second base transceiver station, in accordance with a second air interface protocol, a first request to hand over the given wireless communication device to the second base transceiver station, wherein the second base transceiver station transmits wireless communications to a second plurality of wireless communication devices in accordance with the second air interface protocol and receives wireless communications transmitted from the second plurality of wireless devices in accordance with the second air interface protocol, and wherein engaging in the first portion of the communication session comprises the first base transceiver station wirelessly transmitting to the given wireless communication device communications in accordance with the first air interface protocol;

the second base transceiver station receiving the first request and thereafter the second base transceiver station initiating reservation of first resources, wherein the first resources comprise resources for the given wireless communication device to engage in a second portion of the communication session via the second base transceiver station;

the second base transceiver station transmitting a first notification that identifies the first resources; and the first base transceiver station receiving the first notification that identifies the first resources and, thereafter, transmitting to the given wireless communication device a second notification that identifies the first resources so as to allow the given wireless communication device to handover to the second base transceiver station for engaging in the second portion of the communication session, wherein the second portion of the communication session is carried out in accordance with the second air interface protocol, and wherein transmission of the second notification that identifies the first resources is carried out in accordance with the first air interface protocol.

11. The method of claim 10, wherein transmission of the first notification that identifies the first resources is carried out in accordance with the second air interface protocol.

12. The method of claim 10, wherein transmission of the first notification that identifies the first resources is carried out via a backhaul network.

13. The method of claim 10, wherein after the given wireless communication device is handed over to the second base transceiver station, the method further comprises:

while the given wireless communication device is engaging in the second portion of the communication session, the second base transceiver station transmitting a second request to hand over the given wireless communication device;

the first base transceiver station receiving the second request and thereafter the first base transceiver station initiating reservation of second resources, wherein the second resources comprise resources for the given wireless communication device to engage in a third portion of the communication session via the first base transceiver station;

the first base transceiver station transmitting a first notification that identifies the second resources; and the second base transceiver station receiving the first notification that identifies the second resources and, thereafter, transmitting to the given wireless communication device a second notification that identifies the second resources so as to allow the given wireless communication device to handover to the first base transceiver station for engaging in the third portion of the communication session, wherein the third portion of the communication session is carried out in accordance with the first air interface protocol, and wherein transmission of the second notification that identifies the second resources is carried out in accordance with the second air interface protocol.

14. The method of claim 13,
wherein transmission of the second request is carried out in accordance with the second air interface protocol,
wherein the first base transceiver station receiving the second request comprises the modem receiving the second request, and
wherein the first base transceiver station transmitting the first notification identifying the second resources comprises (i) the modem transmitting the first notification identifying the second resources, or (ii) the first base transceiver station transmitting the first notification identifying the second resources via a backhaul network.

15. The method of claim 13,
wherein transmission of the second request is carried out via a backhaul network, and
wherein the first base transceiver station transmitting the first notification that identifies the second resources comprises (i) the modem transmitting the first notification that identifies the second resources, or (ii) the first base transceiver station transmitting the first notification that identifies the second resources via the backhaul network.

16. The method of claim 10, further comprising:
the given wireless communication device notifying the communications network that the given wireless communication device is operable to communicate via the first air interface protocol and the second air interface protocol.

17. A method comprising:
while a given wireless communication device is engaging in a first portion of a communication session via a first base transceiver station configured to transmit wireless communications to a first plurality of wireless communication devices in accordance with a first air interface protocol and to receive wireless communications transmitted from the first plurality of wireless communication devices in accordance with the first air interface protocol, a modem and antenna of the first base transceiver station wirelessly transmitting to a second base transceiver station, in accordance with the first air interface protocol, a first request to hand over the given wireless communication device to the second base transceiver station, wherein the second base transceiver station transmits wireless communications to a second plurality of wireless communication devices in accordance with the second air interface protocol and receives wireless communications transmitted from the second plurality of wireless devices in accordance with the second air interface protocol, and wherein engaging in the first portion of the communication session comprises the first base transceiver station wirelessly transmitting to the given wireless communication device communications in accordance with the first air interface protocol;

a modem and antenna of the second base transceiver station receiving the first request and thereafter the second base transceiver station initiating reservation of first resources, wherein the first resources comprise resources for the given wireless communication device to engage in a second portion of the communication session via the second base transceiver station;

the second base transceiver station transmitting to the first base transceiver station a first notification that identifies the first resources, wherein transmission of the first notification that identifies the first resources is carried out in accordance with the second air interface protocol; and the first base transceiver station receiving the first notification that identifies the first resources and, thereafter, transmitting to the given wireless communication device a second notification that identifies the first resources so as to allow the given wireless communication device to handover to the second base transceiver station for engaging in the second portion of the communication session, wherein the second portion of the communication session is carried out in accordance with the second air interface protocol, and wherein transmission of the second notification that identifies the first resources is carried out in accordance with the first air interface protocol.

18. The method of claim 17, wherein after the given wireless communication device is handed over to the second base transceiver station, the method further comprises:

while the given wireless communication device is engaging in the second portion of the communication session, the second base transceiver station transmitting a second request to hand over the given wireless communication device, wherein transmission of the second request is carried out in accordance with the second air interface protocol;

the first modem receiving the second request and thereafter the first base transceiver station initiating reservation of second resources, wherein the second resources comprise resources for the given wireless communication device to engage in a third portion of the communication session via the first base transceiver station;

the first base transceiver station transmitting a first notification that identifies the second resources, wherein transmission of the first notification that identifies the second resources is carried out in accordance with the first air interface protocol; and the second base transceiver station receiving the first notification that identifies the second resources and, thereafter, transmitting to the given wireless communication device a second notification that identifies the second resources so as to allow the given wireless communication device to handover to the first base transceiver station for engaging in the third portion of the communication session, wherein the third portion of the communication session is carried out in accordance with the first air interface protocol, and wherein transmission of the second notification that identifies the second resources is carried out in accordance with the second air interface protocol.

19. The method of claim 17, further comprising:

the first base transceiver station determining that forward-link communications from the first base transceiver station exceed a forward-link communications threshold, wherein the forward-link communications are carried out in accordance with the first air interface protocol; and in response to the first base transceiver station determining that the forward-link communications exceed the forward-link communications threshold and prior to the first base transceiver station transmitting the first request to hand over the given wireless communication device, the first base transceiver station determining that the given wireless communication device should be handed over.

20. The method of claim 17, further comprising;

the first base transceiver station determining that backhaul communications from the first base transceiver station exceed a backhaul communications threshold; and in response to the first base transceiver station determining that the backhaul communications from the first base transceiver station exceed the backhaul communications threshold and prior to the first base transceiver station transmitting the first request to hand over the given wireless communication device, the first base transceiver station determining that the given wireless communication device should be handed over.

* * * * *